July 16, 1935. W. SCHAELCHLIN 2,008,404

TURBO ELECTRIC SHIP PROPULSION CONTROL

Filed Nov. 8, 1934 8 Sheets-Sheet 1

WITNESSES:

INVENTOR
Walter Schaelchlin.
BY
Paul E. Friedemann
ATTORNEY

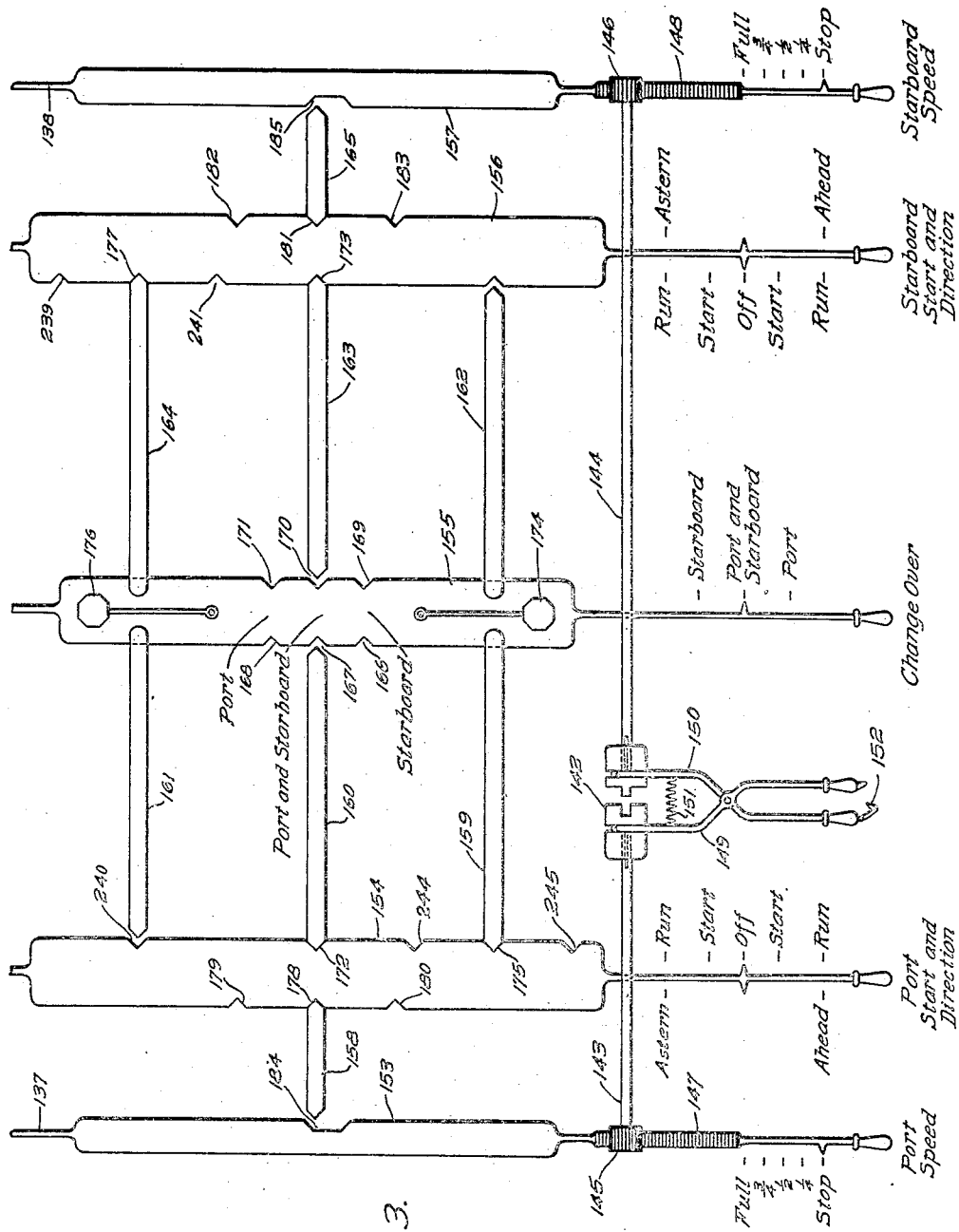

July 16, 1935.  W. SCHAELCHLIN  2,008,404
TURBO ELECTRIC SHIP PROPULSION CONTROL
Filed Nov. 8, 1934  8 Sheets—Sheet 4
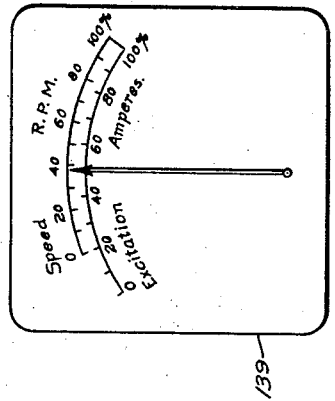
Fig. 5.
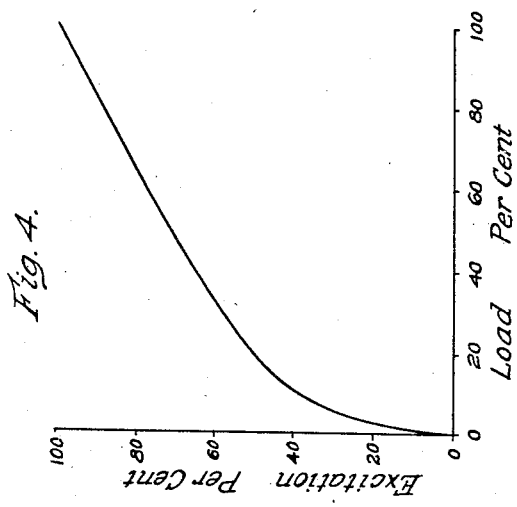
Fig. 4.
Fig. 6.
| Position | Change-Over Switches — Sequence Table |||||||||||||
|---|---|---|---|---|---|---|---|---|---|---|---|---|---|
| | Switch Numbers |||||||||||||
| Port | 23 35 | 24 36 | 25 37 | 26 38 | 27 39 | 28 40 | | | | 118 125 | 119 130 131 | 122 132 133 134 | 123 134 135 | 124 136 |
| Both Generators | 23 35 | 24 36 | 25 37 | | | | 32 41 | 33 42 | 34 43 | 120 126 127 | | | 122 132 133 | 124 136 |
| Starboard | | | | 29 38 | 30 39 | 31 40 | 32 41 | 33 42 | 34 43 | 120 126 127 128 | | | 123 133 134 135 | |
| | | | | | | | | | | 120 127 129 | 121 130 131 | | | |
WITNESSES:  
*C. J. Weller.*  
*Wm. C. Groome*
INVENTOR  
*Walter Schaelchlin.*  
BY  
*Paul E. Friedemann*  
ATTORNEY

Fig. 7.

Direction and Starting Switches — Sequence Table

Switch Numbers.

| Position | | | | | | | | | | | | | | | | | | | | | |
|---|---|---|---|---|---|---|---|---|---|---|---|---|---|---|---|---|---|---|---|---|---|
| Ahead — Run | 45 51 52 | 46 54 55 | 47 57 58 | 60 66 67 | 61 69 70 | 62 72 73 | | 81 90 | 82 91 92 93 | 83 94 | 84 95 | 211 85 96 | | | 219 100 109 | 101 110 | 102 111 | 103 112 113 114 | | | |
| Ahead — Start | 45 51 52 | 46 54 55 | 47 57 58 | 60 66 67 | 61 69 70 | 62 72 73 | | 81 90 | 82 91 92 93 | 83 94 | 84 95 | 211 85 96 | | | 219 100 109 | 101 110 | | 103 112 113 114 | 104 115 | | |
| Off | | | | | | | | 81 90 | 82 91 92 | | 84 95 | 211 85 96 | | | 219 100 109 | 101 110 | | 103 112 113 114 | 104 115 | | |
| | | | | | | | | 81 90 | | | | | 86 97 | 99 108 | 219 100 109 | | | | 104 115 | | |
| Astern — Start | 48 52 53 | 49 54 55 | 50 56 57 | 63 67 68 | 64 69 70 | 65 71 72 | | 81 90 | 87 92 93 | | 89 95 | 211 85 96 | 237 | | 219 100 109 | 105 110 | | | 104 115 | 238 | |
| Astern — Run | 48 52 53 | 49 54 55 | 50 56 57 | 63 67 68 | 64 69 70 | 65 71 72 | | 81 90 | 87 92 93 | 88 94 | 89 95 | | 237 | | 219 100 109 | 105 110 | 106 111 | 107 112 113 | 104 115 | 238 | |
| Astern — Run | 48 52 53 | 49 54 55 | 50 56 57 | 63 67 68 | 64 69 70 | 65 71 72 | | | | | 89 95 | | 237 | | | 105 110 | | 107 112 113 | | 238 | |

INVENTOR
Walter Schaelchlin.

July 16, 1935.  W. SCHAELCHLIN  2,008,404
TURBO ELECTRIC SHIP PROPULSION CONTROL
Filed Nov. 8, 1934   8 Sheets-Sheet 6

WITNESSES:

INVENTOR
Walter Schaelchlin.
BY
Paul E. Friedemann
ATTORNEY

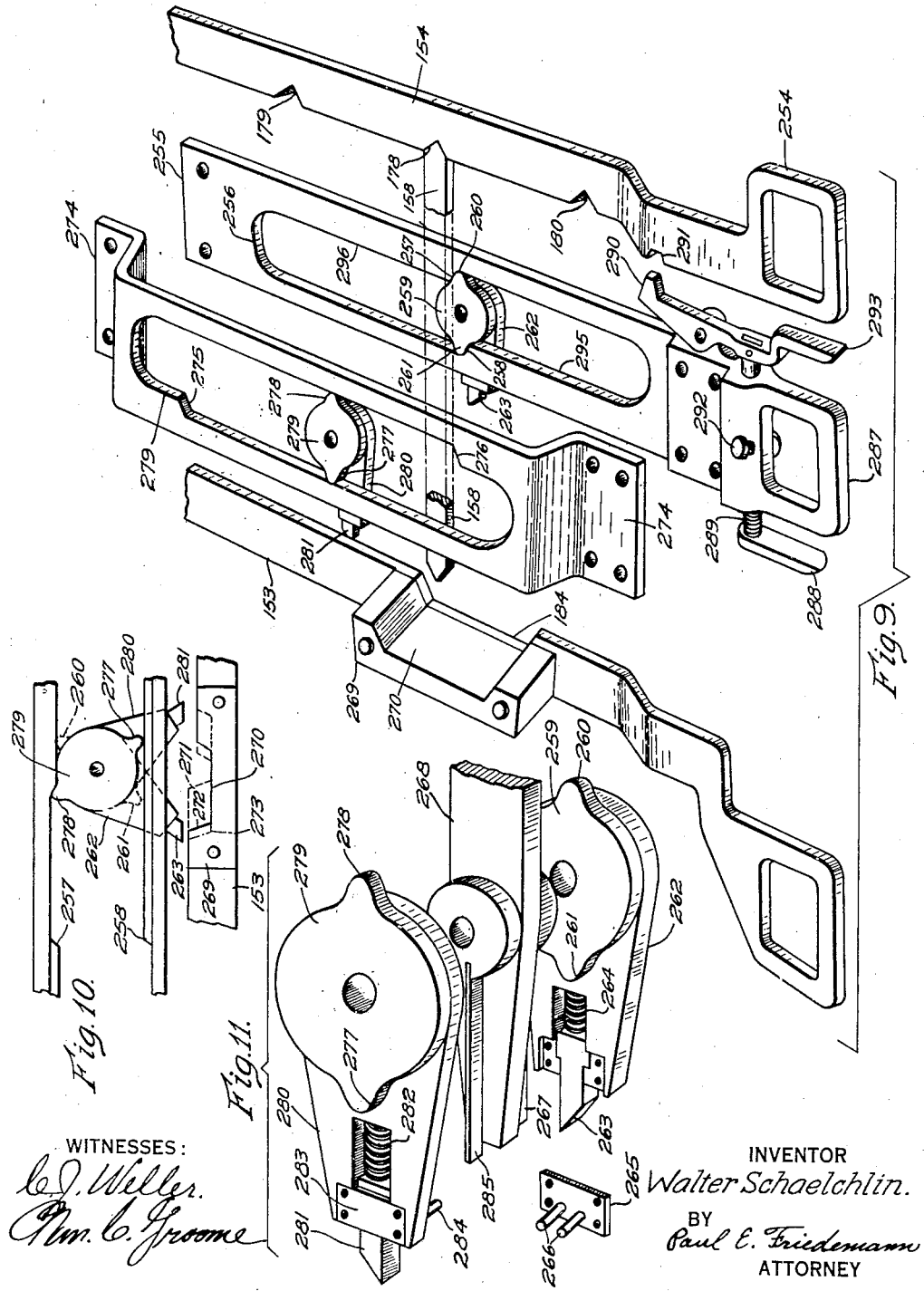

July 16, 1935.    W. SCHAELCHLIN    2,008,404
TURBO ELECTRIC SHIP PROPULSION CONTROL
Filed Nov. 8, 1934    8 Sheets-Sheet 8
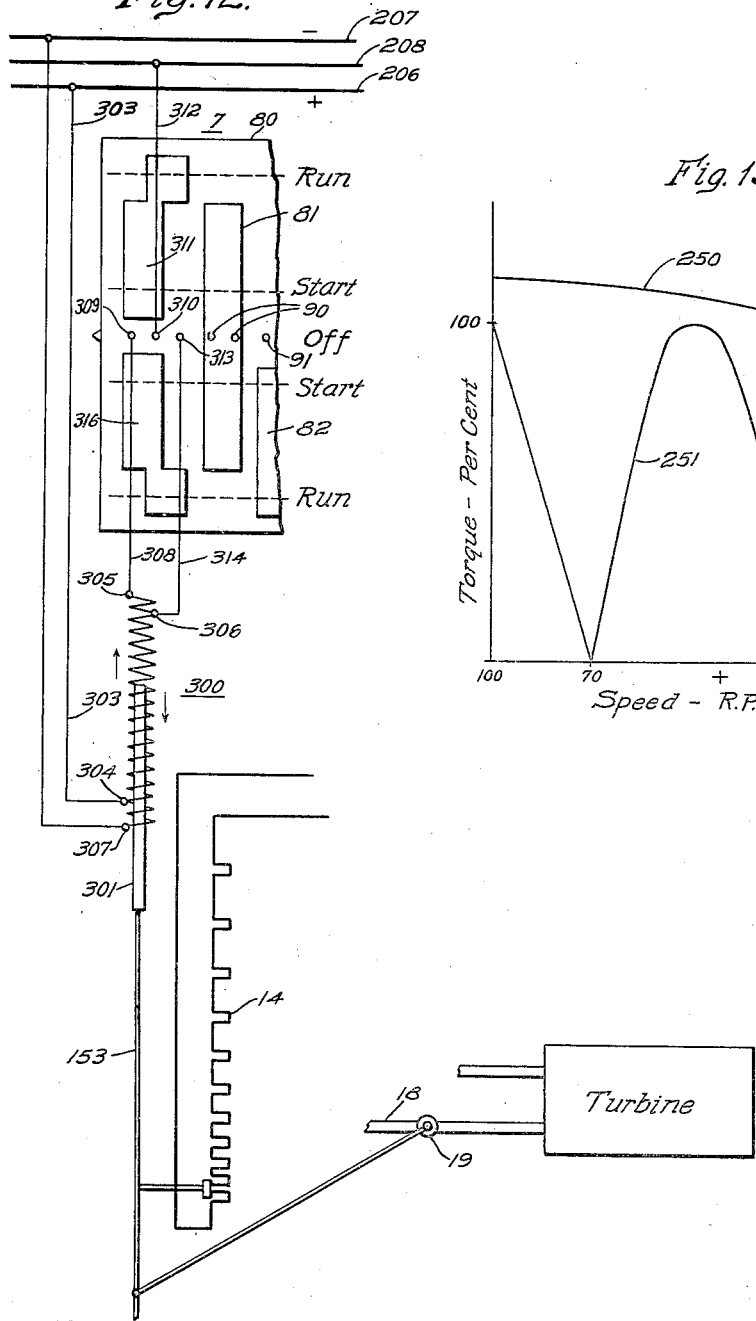
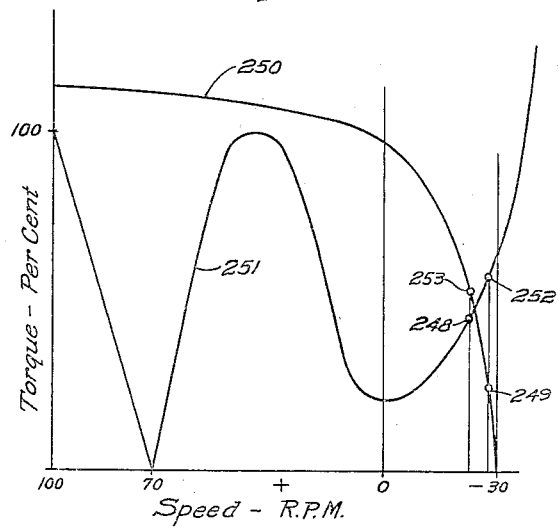
WITNESSES:
INVENTOR
Walter Schaelchlin.
BY
Paul E. Friedemann
ATTORNEY Patented July 16, 1935

2,008,404

UNITED STATES PATENT OFFICE 2,008,404

TURBO-ELECTRIC SHIP PROPULSION CONTROL

Walter Schaelchlin, Wilkinsburg, Pa., assignor to Westinghouse Electric & Manufacturing Company, East Pittsburgh, Pa., a corporation of Pennsylvania Application November 8, 1934, Serial No. 752,071

40 Claims. (Cl. 172—8)

My invention relates, generally, to control systems and more particularly to control systems that may be utilized for operating ship-propulsion motors.

An object of my invention is the provision of a control system of the class indicated that shall be simple and reliable in operation and be economically manufactured and installed.

Another object of my invention is to vary the excitation of the generator and motor of an electric ship propulsion system at the same time that the speed of the prime mover is varied.

A more specific object of my invention is to weaken the field excitation of the generator and motor of an electric ship propulsion system at the same time the quantity of steam being supplied to a turbine of the propulsion system is being decreased.

A further object of my invention is to deenergize the field windings of the generator and the motor of an electric ship propulsion system during shutdown or reversal at the same time the main connection between the generator and the motor of the system is opened.

A more specific object of my invention is to provide for reversing the motor of an electric ship propulsion system by decreasing the excitation of both the generator and motor to a given low value and simultaneously decreasing the quantity of steam, supplied to the prime mover, deenergizing the field windings of both the generator and the motor substantially at the same time the main connections between the motor and generator are opened and after such decrease in the quantity of steam admitted to the prime mover, reenergizing the field windings of both motor and generator at substantially the same time the reverse connections between the motor and the generator are established, and thereafter increasing the excitation of the fields for both the motor and the generator at the same time the steam admitted to the prime mover is increased.

A still further and specific object of my invention is to over-excite the motor and generator, for the reversing cycle, during the increase in the quantity of steam being admitted to the prime mover, at an instant after the motor connections are reversed.

It is also an object of my invention to provide for the selective connection of any one, or all of a plurality of motors in circuit relation with any one, or all of a plurality of generators, and the selective mechanism being so interlocked as to prevent the operator from improperly connecting the motors and the generators in circuit relation.

A still further object of my invention is to provide for the selective connection of any one, or all, of a plurality of synchronous motors in circuit relation with any one, or all, of a plurality of generators, the field windings being so energized as to meet the requirements that may be called for by the motor-generator selective apparatus, the motor-generator selective apparatus being interlocked to insure that its circuits are made effective at substantially the same time that said field windings can be energized.

A further object of my invention is to control the field windings of a synchronous motor and an alternator in a ship-propulsion system from the same lever, or operating means, adapted to vary the admission of steam to the prime mover for the alternator.

A still further object of my invention is to provide, in an electric ship-propulsion system including, with the control means, an alternator, a synchronous motor, and a prime mover for the alternator, apparatus for energizing the fields of the alternator and motor substantially at the same time the alternator and motor are interconnected for a selected direction of motor operation, the steam being admitted to the prime mover to be increased above a certain value except when said apparatus is in a given operative position.

Another object of my invention is to provide motor-generator selective means for selectively connecting any number of a plurality of motors in circuit relation with any number of a plurality of alternating current generators, it being insured that the speed of the selected generator or generators, as the case may be, is less than a predetermined low value while the motor-generator selective means, or change-over means, are being operated.

It is also an object of my invention to decrease the speed of an alternator to decrease its frequency at the same time a synchronous motor, adapted to be driven by the alternator, is transferred from induction motor operation to synchronous motor operation.

A somewhat more specific object of my invention in connection with a system of control for electric ship propulsion is to connect the motor to the generator for induction motor operation while the quantity of steam admitted to the prime mover driving the generator is low so that the connection is made at a low frequency of the generator, and to decrease the quantity of steam admitted to the prime mover at the same time the motor is transferred from induction motor operation to synchronous motor operation.

A further object of my invention is to provide for automatically decreasing the frequency of a source of alternating current in a ship propulsion system as a synchronous motor for driving the propeller of a ship is transferred from induction motor operating connection to synchronous motor operating connection.

Other objects and a fuller understanding of my invention may be had by referring to the following description taken in connection with the accompanying drawings, in which:

Fig. 3 is a diagrammatic view of the rear part only of the complete control system and illustrates mainly the mechanical interlocks and the levers appearing on the operating disk;

Fig. 4 is a curve illustrating the variations of excitation required to obtain the desired torque margin over the whole load, or speed range;

Fig. 5 shows the kind of scale that may be provided for the field ammeters whereby the mere indications of the ammeter will constitute an indication of the stability of the system.

Fig. 6 is a sequence chart of the various switches operated by the motor-generator change-over lever;

Fig. 7 is a sequence chart of the various switches operated by the direction levers;

Figure 1:
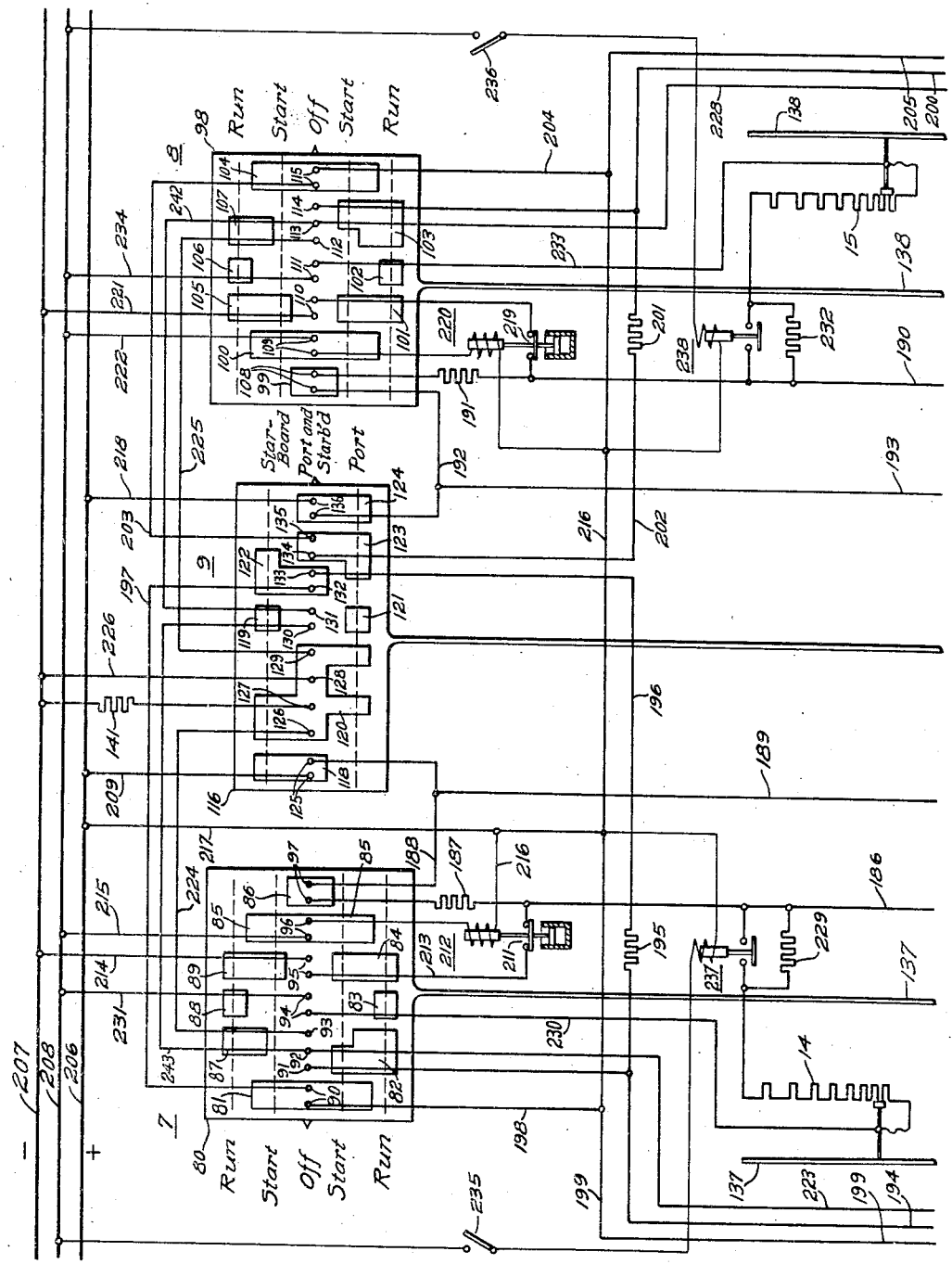
Figure 1 is a diagrammatic view of the forward part only of a complete control system and illustrates mainly the field control.
Figure 2:
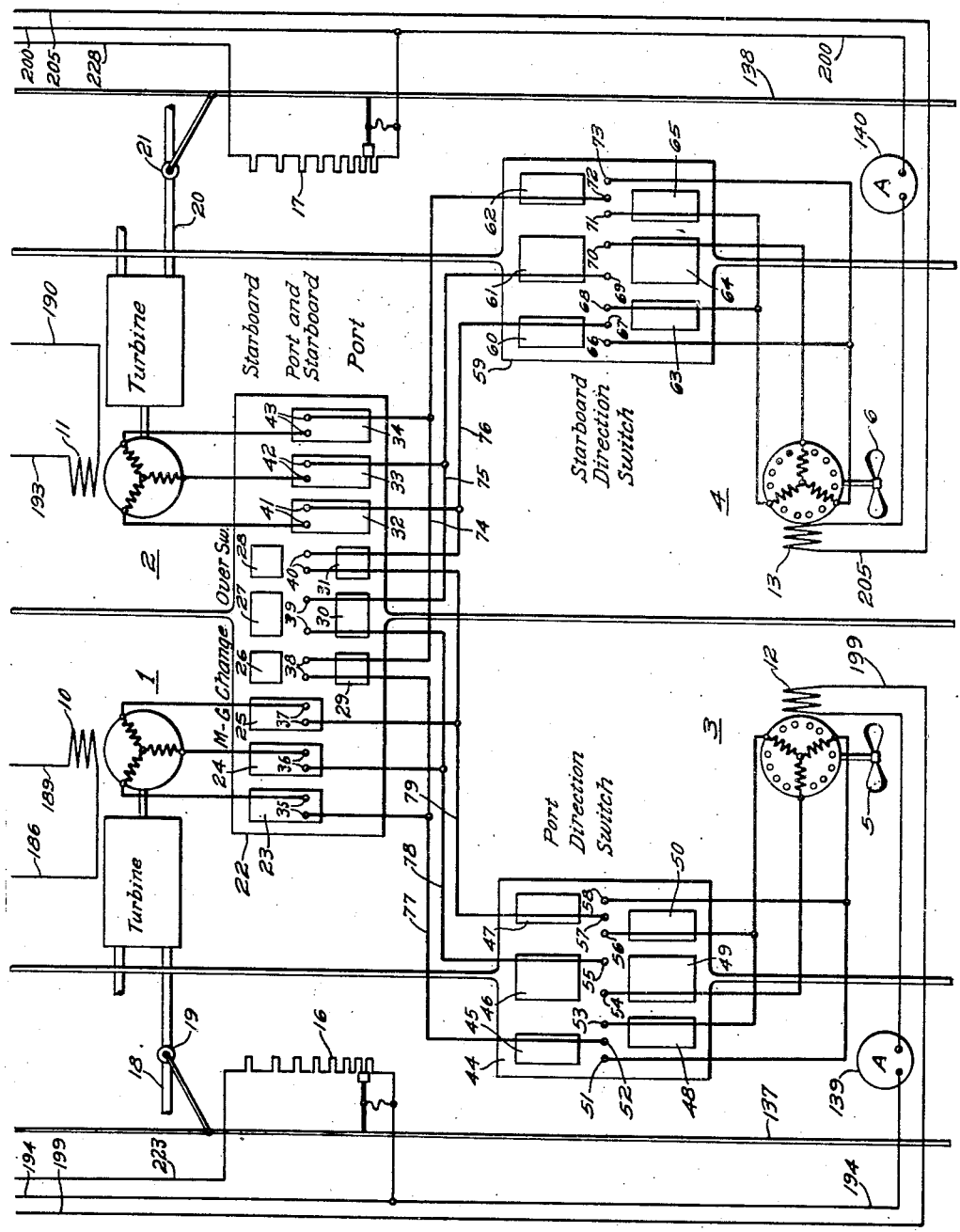
Fig. 2 is a diagrammatic view of the middle part, mainly of the motors and generators together with the direction switches and the motor-generator change-over switches.

Figs. 9, 10 and 11 are detailed showings of mechanical features which may be added to the system of control illustrated diagrammatically in Figs. 1, 2 and 3 and which features are adapted to automatically decrease the frequency of the generator, or generators, of a ship propulsion system at the time that a synchronous motor, or motors, is transferred to synchronous motor operation from initial induction motor operation;

Fig. 12 is a diagrammatic showing of electric means to be used with the control system shown in Figs. 1, 2 and 3, for accomplishing the same results accomplished by the mechanical features shown in Figs. 9, 10 and 11; and Fig. 13 illustrates a pair of curves showing, respectively, the characteristics of a ship-propulsion motor for certain operations, and the load characteristics of the ship propeller during reversal.

When considering the control system, that part designated as Fig. 2 should be placed and aligned between the parts designated as Figs. 1 and 3, making the Figs. 1, 2 and 3 read from top to bottom, or what is really more correct, making Figs. 1, 2 and 3 read, in the order given, from front to rear, or from the bow towards the stern of the ship. The operator, or attendant, at the operating desk where the levers appear in Fig. 3 thus faces the bow of the ship and the starboard motor and starboard generator and the port motor and port generator will thus appear correctly, namely, at the right and left, respectively. The operating desk may, in fact, be provided with a diagram of the circuits illustrating the control in the same relation as shown in these Figs. 1, 2 and 3 reading from top to bottom.

With reference to the drawings, my invention comprises, generally, two alternating current generators 1 and 2 driven respectively by the two turbines shown; two synchronous motors 3 and 4 arranged to drive the screw propellers 5 and 6; respectively, a motor-generator selective switch, designated as M-G change-over switch in Figs. 2 and 3; two direction switches for reversing the direction of rotation of the motors; three field control switches two of the field control switches 7 and 8 being directly coupled, to the port direction switch and starboard direction switch levers, respectively, and the third field control switch 9 being coupled directly to the change-over switch, which change-over switch is adapted to selectively energize the field windings 10 and 11 of the generators 1 and 2, respectively, and the field windings 12 and 13 of the motors 3 and 4, respectively; two generator field rheostats 14 and 15 coupled to be operated by port and starboard speed levers, respectively, and two motor field rheostats 16 and 17 coupled to the port and starboard speed levers, respectively; and mechanical interlocking means for insuring that the proper circuit connections are effected.

The turbines may be of any well known construction, but in the present invention, since the motors 3 and 4 are of the synchronous type, the turbines are of the variable speed type so that the speed and frequency of the generators may be varied for regulating the speed of the motors. As illustrated, the admission of the live steam through the intake pipe 18 of the port turbine is controlled by the throttle valve 19. The throttle valve 19, in turn, is directly connected to the port speed lever shown at the left in Fig. 3. Similarly, the admission of the live steam through the intake pipe 20 is controlled by the throttle valve 21. This throttle valve, in turn, is directly connected to the starboard speed lever, shown at the right in Fig. 3.

In the interest of clarity, the generator 1 and the motor 3 will, hereinafter, be referred to as the port generator and port motor, respectively, and the generator 2 and the motor 4 will, hereinafter, be referred to as the starboard generator and starboard motor, respectively.

For the purpose of providing a number of different connections between the motors and the generators, I employ a motor-generator change-over switch, a port direction switch and a starboard direction switch. The motor-generator change-over switch comprises a slidably mounted base 22 upon which are properly arranged a plurality of contact segments 23 to 34, inclusive, which segments are disposed to cooperate with a plurality of aligned sets of stationary contact fingers 35 to 43, inclusive. The slidably mounted base is directly connected by a bar to the mechanical interlock for the motor-generator change-over switch. The port direction switch and the starboard direction switch are somewhat similar in construction to the motor-generator change-over switch.

The port direction switch comprises a slidable base 44 upon which are properly arranged a plurality of contact segments 45 to 50, inclusive which segments are disposed to cooperate with a plurality of aligned stationary contact fingers 51 to 58, inclusive. The base for the port direction switch is directly connected by a bar to the mechanical interlock for the port direction switch.

The starboard direction switch comprises a slidable base 59 upon which are properly arranged a plurality of contact segments 60 to 65, inclusive, which segments are disposed to cooperate with a plurality of aligned stationary contact fingers 66 to 73, inclusive. The base 59 of the starboard switch is directly connected by a bar to the mechanical interlock for the starboard direction switch.

As is apparent, a number of different operating conditions may be satisfied by the combined operation of the motor-generator change-over switch and the port and starboard direction switches. When the operating conditions call for a maximum speed, which represents, in the case of a screw propeller, the maximum load condition, the port motor and the starboard motor are individually and directly connected to the port generator and starboard generator, respectively. In order to effect this circuit arrangement, the motor-generator change-over, or selective switch is actuated to the central position which will, hereinafter, be designated as the port-and-starboard position, that is, the indicated P and St'd. position on the drawings. As illustrated, the rotation directions of the synchronous motor 3 and the synchronous motor 4 are controlled, respectively, by the port direction switch and the starboard direction switch. When the operating conditions call for forward movement, the port and starboard direction switches are actuated to their respective ahead positions, and when the operating conditions call for backward movements, the port and starboard direction switches are operated to their respective astern positions. Also, the motors may be disconnected from the generators when the port and starboard direction switches are actuated to their respective off positions.

From approximately 75% of the maximum speed to minimum speed, which represents approximately one-half load to minimum load, as the load varies as the cube of the speed of the propeller shaft, the most efficient circuit arrangement is to operate both of the motors from either one of the two generators. By this arrangement, one of the turbines and its corresponding generator may be shut down, while the other turbine and its corresponding generator provides the electric energy for the two motors.

As is apparent, when the load on each motor is less than 50% of the capacity of its corresponding generator, such an arrangement as explained in the preceding paragraph provides a much more efficient drive than does the circuit arrangement that requires that each motor be energized from its corresponding generator. If, for illustration, the operator desires to connect both motors in circuit relation with the starboard generator, this may be done by actuating the base 22 for the motor-generator change-over switch to the starboard position, thus causing the contact fingers and the proper segments to align. In this position the set of contact fingers 35 to 37, inclusive, no longer engage the contact segments 23, 24 and 25, with the result that the port generator 1 is disconnected from the port motor 3.

Just as soon as the port generator is disconnected, a governor, (not shown) that is responsive to load conditions, immediately causes the speed of the port turbine to decrease to a relatively low value. However, if the operating conditions are such that the port generator is not likely to be needed within a reasonable length of time, the operator may completely shut down the turbine by operating the usual control valves, (not shown).

When, as hereinbefore assumed, the motor-generator change-over switch is in the starboard position, that is, the base 22 has been moved forward, the current, upon leaving the starboard generator 2, flows through the set of contact fingers 41, 42 and 43 bridged by the contact segments 32, 33 and 34; and thence to the motors in parallel, substantially half of the current flowing directly to the starboard motor 4 through the starboard direction switch, and the remaining half of the current flowing through the transversely disposed conductors 74, 75 and 76, the set of contact fingers 38, 39 and 40 bridged by the contact segments 29, 30 and 31, the transversely disposed conductors 77, 78 and 79, and the port direction switch to the port motor 3.

On the other hand, when the operator desires to operate both of the motors from the port generator, this may be done by actuating the motor-generator change-over switch to the port position. In the port position, the set of contact fingers 41, 42 and 43 no longer engage the contact segments 32, 33 and 34, with the result that the starboard generator is disconnected from the starboard motor. As soon as the starboard generator is disconnected, a governor (not shown) that is responsive to load conditions immediately causes the speed of the starboard turbine to decrease to a relatively low value. Also, if the operating conditions are such that the starboard generator is not likely to be needed for a reasonable length of time, the operator may completely shut down the starboard turbine by operating the usual control valves (not shown).

Also, by the combination of the motor-generator change-over switch and the two direction switches, the starboard motor 4 only may be connected in circuit with the port generator only, or the port motor 3 only may be connected in circuit with the starboard generator only. The starboard motor 4 may be connected in circuit relation with the port generator 1 only, by actuation of the motor-generator change-over switch to the port position, the starboard direction switch either to the ahead or the astern position, and the port direction switch to the off or neutral position, that is, the position shown in the drawings.

When the motor-generator change-over switch is in the port position the current, upon leaving the port generator, flows through the set of contact fingers 35, 36 and 37 bridged by the contact segments 23, 24 and 25, and thence to the motors in parallel, substantially half of the current flowing directly to the port motor 3 through the port direction switch, and the remaining half of the current flowing through the transversely disposed conductors 77, 78 and 79, the set of contact fingers 38, 39 and 40 bridged by the contact segments 26, 27 and 28, the transversely disposed conductors 74, 75 and 76 and the starboard direction switch to the starboard motor.

Conversely, the port motor 3 only may be connected in circuit relation with the starboard generator 2 only by actuation of the motor-generator change-over switch to the starboard position, the port direction switch to either the ahead or the astern position, and the starboard direction switch to the off position, that is, the position indicated in the drawings.

By the switching arrangements hereinbefore explained either one of the two motors may be separately operated in circuit relation with either one of the two generators, or both of the motors may be operated from either one of the two generators. This provides a very flexible arrangement so that repairs may be made upon either one of the two motors, or either one of the two generators while others are driving the vessel.

For the purpose of energizing the generator fields 10 and 11 and the motor fields 12 and 13 in accordance with the motor-generator requirements, as determined by the motor-generator change-over switch, I employ three field switches 7, 8 and 9, which will hereinafter be referred to as the port field switch, the starboard field switch, and the port-and-starboard field switch, respectively. The port field switch 7 comprises, generally, a slidably mounted base 80 upon which are properly arranged a plurality of contact segments 81 to 89, inclusive, and a plurality of aligned stationary contact fingers 90 to 97, inclusive. The slidably mounted base 80 is coupled to the port direction switch so that actuation of the port direction switch also actuates the port field switch 7.

The starboard field switch 8 is similar in construction to the port field switch 7, and comprises a slidably mounted base 98 upon which are properly arranged a plurality of contact segments 99 to 107, inclusive, and a plurality of stationary contact fingers 108 to 115, inclusive. The base 98 is coupled directly to the starboard direction switch so that the starboard field switch and direction switch may be operated simultaneously.

As indicated in the drawings, that is, in Fig. 3 at the levers on the operating desk for the port field and direction switches and the starboard field and direction switches, the field switches may be actuated to any one of five positions, namely, the run ahead position, the start ahead position, the off position, the start astern position, and the run astern position. The two run positions each consist of a pair of positions, as hereinafter set forth.

The positioning of the contact segments on the direction switches with reference to their cooperating stationary contact fingers and the contact segments on the corresponding field switches with reference to their cooperating stationary contact fingers, is such that the direction switches close for either direction of motor operation at the same time that the corresponding field switches are in the start position. In other words, when the port direction switch is moved to start position forwardly, which will be for astern operation, contact fingers 52 and 53, and 54 and 55 and 56 and 57 will be bridged by contact segments 48, 49 and 50, respectively, on base 44, at the same time that contact fingers 93, 91 and 92, and 95 and 96 are bridged by contact segments 81, 82, 84 and 85, respectively, on base 80. Similarly, when the port direction switch is moved to start position backwardly, which will be for the ahead operation, contact fingers 51 and 52, 54 and 55, and 57 and 58 will be bridged by contact segments 45, 46 and 47, respectively, on base 44, at the same time that contact fingers 95, 90 and 96 are bridged by the contact segments 81, 89 and 85, respectively, on base 80.

On the starboard side the relation of the direction switch to the field switch is the same as just explained for the port direction switch and port field switch. That is, the bridging of contact fingers 67 and 68, 69 and 70, and 71 and 72 by the segments 63, 64 and 65 respectively, on base 59 occurs at the same time that contact fingers 109, 110, and 113 and 114 and 115 are bridged by contact segments 100, 101, 103 and 104, respectively, on base 98. Similarly, the bridging of contact fingers 66 and 67, 69 and 70, and 72 and 73 on the starboard direction switch occurs at the same time contact fingers 109, 110, 112 and 113, and 115 are bridged by the segments 100, 105, 107 and 104, respectively, on the base 98 of the starboard field switch.

The port-and-starboard field switch 9 is similar in construction to the port field switch and the starboard field switch, and comprises a slidably mounted base 116 upon which are properly arranged a plurality of contact segments 118 to 124, inclusive, which are adapted to cooperate with aligned stationary contact fingers 125 to 136, inclusive. As indicated on the drawings, the port-and-starboard field switch 9 may be actuated to any one of three positions, namely, port, port-and-starboard, and starboard.

The port-and-starboard field switch is directly coupled to the motor-generator change-over switch, so that the positions of the port-and-starboard field switch correspond to similar positions of the motor-generator change-over switch. That is to say, when the motor-generator change-over switch is actuated to the port-and-starboard position, separately connecting the starboard motor in circuit with the starboard generator, and the port motor in circuit with the port generator, the port-and-starboard field switch 9 is actuated to the corresponding port-and-starboard position, establishing circuits such that the starboard motor and generator fields are controlled exclusively by the starboard field switch 8, and such that the port motor field windings and port generator field windings are controlled exclusively by the port field switch.

On the other hand, when the motor-generator change-over switch is actuated to the starboard position, thus connecting both of the motors in circuit relation with the starboard generator only, the port-and-starboard field switch 9 is actuated to the corresponding starboard position, establishing circuit such that the field windings of both motors and of the starboard generator are controlled exclusively by the starboard field switch 8 and, at the same time, deenergizing the field winding of the port generator, and removing the field connections entirely from the port field switch 7.

Conversely, when the motor-generator change-over switch is actuated to the port position, thus connecting both of the motors in circuit relation with the port generator, the port-and-starboard field switch 9 is actuated to the corresponding port position, establishing circuits such that the field windings of both motors and of the port generator are controlled exclusively by the port field switch 7 and, at the same time, deenergizing the field winding of the starboard generator, and removing the field connection entirely from the starboard field switch 8.

Therefore, from the foregoing, it has been seen that the actuation of the motor-generator change-over switch and the port-and-starboard field switch 9 as a unit, establishes such field circuit connections as are necessary to meet the motor-generator circuit requirements which may be called for by a selected actuation of the motor-generator change-over switch.

As the load upon a motor driving a propeller varies as the cube of the speed of the propeller shaft, the power factor in the line connections between the generator and the motor would, in the absence of my simplified control scheme, vary over relatively wide limits. However, in the present invention, I couple the control for the port and motor generator field rheostats 14 and 16, respectively, to the speed lever 137, that is the lever controlling the admission of steam to the port turbine. Rheostats 15 and 17 for the starboard machines are similarly connected to the speed lever 138. If a given movement of the speed lever causes a proportional change in the speed of the turbine then, to increase the torque margin for the lower speeds, the action of the speed lever on the field rheostats must be such that the field excitation for both the motor and the generator must not be decreased proportionally. Fig. 4 illustrates a typical curve of the excitation required as a function of the load or speed. This excitation is necessary to insure the same value of, or if desired an increasing value of, torque margin over the whole speed range. The curve may, of course, be varied somewhat in shape so as to get a higher stability or decreased losses at the lower speeds.

By a proper choice or disposition of the resistor sections on the field rheostats, the power factor may be maintained at unity for the entire speed range, or the power factor may even be made to lead more and more for the lower speeds. The increasing value of torque margin that thus results is an important improvement and advantage, secured, in a very simple manner, by the present invention. In ship propulsion, and particularly during maneouvering there is nothing more disastrous than the loss of propeller power. To maintain, or increase, the value of torque margin prevents loss of propeller power.

In connection with the foregoing explanation attention is called to the field rheostats shown in Figs. 1 and 2. A decrease in speed requires a decrease in excitation, but to increase the stability the rate of decrease in the excitation is made less than the rate of speed decrease. In other words, the excitation is increased more and more with reference to the speed, as the speed is decreased. In the rheostats 14, 15, 16 and 17 the same number of resistor sections are not shunted for a given movement of the speed lever for all positions of the speed lever. At the lower speeds more sections are shunted. The particular showing of the rheostats is merely illustrative but made for purposes of clarity. In actual practice the contact fingers on the rheostats may be uniformly distributed and the resistance valves of the resistor sections intermediate each pair of contact fingers is varied. To aid the attendant in initially adjusting the excitation with reference to the speed the field ammeters 139 and 140 may be provided with a pair of graduations as shown in Fig. 5 showing the speed and the desirable field current for a given motor and generator. Once the resistance value is properly selected for the field circuit the attendant need only watch the field ammeter to determine the stability of the system.

A synchronous motor is said to be over-excited or under-excited according as the excitation is greater or less than normal, normal excitation being that which produces unity power factor. Over-excitation produces a condensive action and causes the motor to take a leading current, and, conversely, an under-excitation produces a reactive action and causes the motor to take a lagging current. The effect produced on a motor by a lagging or leading current is just opposite to that produced by these currents on a generator, because the armature reaction depends upon the phase relation between the current and the generator voltage. Therefore, in view of the fact that the current of the motor and the current of the generator are nearly opposite in phase with respect to the generator voltage, the effect produced on the field by a leading or a lagging current in a motor is just opposite to the effect produced on the field by similar currents in a generator.

For the purpose of so proportioning the field excitation of the starboard motor with respect to the field excitation of the starboard generator, as to maintain the current delivered to and the voltage impressed upon the motor substantially in phase, I employ a pair of adjustable rheostats 15 and 17 mechanically coupled to the same lever, namely the starboard speed lever 138. The rheostats are so calibrated, after the motor and generator is installed that by operating the speed lever 138 to vary the admission of steam to the starboard turbine corresponding, but not proportional, changes are effected in the excitation of the starboard motor field winding and the starboard generator field winding, with the result that by the combined actions of the motor and generator, unity, or if desired a progressively more leading, power factor prevails in the line connections between the armature of the starboard motor and the starboard generator for all speeds from full speed to a zero speed for the starboard motor.

By connecting the field rheostats directly to the speed lever, the control for the fields is automatic and takes place at the same time the steam admission is changed. Further the amount of equipment is reduced and the control is very much simplified and in addition no field lever nor stability indicator are needed. The control desk is thus simpler and smaller.

The construction, calibration, and operation of the adjustable field rheostats 14 and 16 which are respectively connected in circuit relation with the port motor field winding and the port generator field winding are the same as those just described for the adjustable rheostats 15 and 17. Therefore, by automatically controlling the excitation as a function of the position of the speed lever unity, or, if desired, a leading power factor may be maintained in the connections between the motors and generators, so that maximum efficiency is obtained for the motors and generators and the possibility of losing propeller power is eliminated.

It will be observed, however, that, when both motors are operated from either one of the two generators, the power factor of the line connection between the armature of the selected generator and of the two motors is no longer unity. This is because the total load of the selected generator is now divided between the two motors. Under this condition, assuming that the resistance drop of each motor is substantially negligible, the reactive drop of each motor is substantially half as much as the reactive drop of the selected generator. This means that each of the motors will take a leading current, unless the field excitation of both of the motors is reduced to a point where unity power factor of the line connections is restored. For the purpose of restoring unity power factor in the connections between the armatures of the motors and the armature of the selected generator, the field excitation of each of the motors is decreased by inserting the power-factor correction resistor 141 in circuit with the field windings of both the port and starboard motors. This circuit arrangement is clear from the fact that the movement of the motor-generator change-over switch to either port or starboard position opens the bridging circuit for the contact fingers 127 and 128 by means of the contact segment 120. See also the sequence chart Fig. 6.

As illustrated, for the purpose of simultaneously operating the adjustable rheostats 14, 15, 16 and 17, in order to insure that the field excitations of the two motors and of the selected generator are varied together, the two speed levers which are adapted to operate the rheostats are coupled together by means of a pair of clutch elements 142 slidably mounted on adjacent ends of shafts 143 and 144. The outer ends of shafts 143 and 144 are provided with pinions 145 and 146, respectively, which cooperate with racks 147 and 148, respectively, disposed on the port and starboard speed levers 137 and 138, respectively.

The clutch elements 142 are disposed for actuation by means of a pair of pivotally mounted control levers 149 and 150. The levers are pivoted in a scissor-like manner so that when they are moved towards each other, the clutch elements are brought into engagement for effecting simultaneous operation of the rheostats of the two motor fields and the rheostat of the generator selected.

Inasmuch as operating conditions of the greater part of the cruising distance, call for both the motors and both the generators, the clutch elements 142 are normally biased to a disengaged position by the spring 151 disposed between the ends of the control levers 149 and 150 disposed adjacent the clutch elements. In order that the speed control may be effected from either speed lever, regardless of whether a given generator is selected or whether both generators and both motors are utilized, the levers 149 and 150 are provided with a latch 152 adapted to hold the clutch elements 142 in engagement.

If the motor-generator change-over switch be in the starboard position the port generator is disconnected from the motors and the starboard generator is selected. Any movement of the starboard direction switch thus prevents any movement of the port direction switch. This is accomplished by suitable interlocks to be described more in detail hereinafter. The starboard speed lever is, however, not prevented from being moved by any interlock. By connecting the two shafts 143 and 144 by the clutch element 142, the two motor field rheostats and the starboard generator field rheostat may be operated from either speed lever. Since the no-load governor for the port turbine prevents the flow of steam to the port turbine, no harm is done if the field rheostat 14 for the port generator and the valve 19 are operated by actuation of the starboard speed lever.

When the motor-generator change-over switch is in the starboard position, the port generator is disconnected from the motors. By closing the clutch elements 142 the entire control may be effected by the starboard direction lever and either speed lever. The arrangements just discussed does, however, not preclude independent field control for the motors nor the direction of operation of the motors, as will become clearer later.

As illustrated, the motor-generator change-over switch, the starboard direction switches, the port direction switches, and the two speed levers are all mechanically interlocked so as to prevent the operator making improper circuit connections. The major purpose of the interlocking system is to insure that the field windings are progressively excited less and less with a decrease in speed and further to insure that the field excitation is quite low when the circuit for the field windings is interrupted at the same time the main circuits between the respective motors and generators or the motors and the generators selected, are interrupted. In other words, the main circuits are opened substantially simultaneously with the opening of the field circuits and closed substantially simultaneously with the closing of the field circuits, but the impedances in the field circuits are such during opening as well as during closing that the excitation will be only about thirty percent of normal at opening and could only rise to about thirty percent of normal at closing.

The interlocking system is illustrated somewhat diagrammatically in Fig. 3, since the results accomplished by the system shown may be accomplished in a number of different ways and by a number of different means. The system shown comprises a plurality of longitudinally disposed slidably mounted bars 153 to 157 inclusive, and a plurality of transversely disposed slidably mounted bars 158 to 165, inclusive. The ends of all the transversely disposed bars except two ends of bars 159 and 162, and 161 and 164 are V-shaped and are disposed to engage complementary V-shaped notches in the longitudinally disposed slidably mounted bars. In this manner, when any one of the operating levers is actuated in advance of its proper sequence, the associated transversely disposed bar or bars, as the case may be, operate to prevent the further operation of any of the levers unless the improperly operated lever is restored to its correct position.

The separate function of each lever of the interlocking system is as follows:

(1) The motor-generator change-over lever, or bar 155 cannot be moved unless both the port and the starboard direction levers, or bars 154 and 156, are in the off positions, because, in any other positions, the left or port end of the transversely disposed bar 160 would ride upon the right or starboard surface of the longitudinally disposed bar 154 and cause the right V-shaped end of bar 160 to engage any one of the V-shaped notches 166, 167 or 168, and the right end of the transversely disposed bar 163 to ride on the left surface of the longitudinally disposed bar 156 and cause the V-shaped left end to engage any one of the V-shaped notches 169, 170 or 171.

(2) Neither the port nor the starboard direction lever can be moved unless the motor-generator change-over lever, or bar 155, is in one of the three operating positions, namely, port position, port-and-starboard position, or starboard position. If the bar 155 be not in one of the three operating positions, the right end of the transversely disposed bar 160 will ride on the port surface of the bar 155 and cause the left, or port, V-shaped end of bar 160 to engage the V-shaped notch 172 in bar 154, and the left, or port, V-shaped end of bar 163 to ride on the starboard or right surface of bar 155 and cause the right V-shaped end of bar 163 to engage the V-shaped notch 173 in bar 156.

(3) The port direction lever, or bar 154 cannot be moved if the motor-generator change-over bar 155 is in the starboard position and the starboard field lever, or bar 156, is out of the off position, because, in such positions, the pivotally mounted block 174, carried by bar 155, is thrust between the adjacent rounded ends of the transversely disposed bars 159 and 162. Therefore, if the right end of bars 162 be riding on the left surface of bar 156, the left V-shaped end of bar 159 is positively thrust into engagement with the V-shaped notch 175 in bar 154.

(4) Also, the starboard direction lever, or bar 156, cannot be moved if the motor-generator change-over lever, or bar 155 be in the port position and the port direction lever, or bar 154, is out of the off position, because, in such positions, the pivotally mounted block 176, carried by bar 155, is thrust between the adjacent rounded ends of the transversely disposed bars 161 and 164. Therefore, if the left end of bar 161 be riding on the right surface of bar 154 the right end of bar 164 is positively thrust into the V-shaped notch 177 on bar 156, thus preventing any movement of car 156.

(5) The port speed lever 137, or the bar 153 of the interlock, can only be moved when the bar 154, controlling the port field switches and port direction switches, is in either the off position or the final run positions. That is, the bar 153 cannot be actuated, except between approximately one-quarter speed and below, unless the right V-shaped end of the transversely disposed bar 158 registers with any one of the V-shaped notches 178, 179 and 180 on bar 154.

(6) The starboard speed lever, or bar 157 can only be moved when the bar 156, controlling the starboard field switches and starboard direction switches, is either in the off position or the final run positions. That is, the starboard speed lever, or bar 157 cannot be actuated, except between approximately one-quarter speed and below, unless the left V-shaped end of bar 165 registers with any one of the V-shaped notches 181, 182 and 183.

The sequence in operating the starboard motor from the starboard generator and the port motor from the port generator is as follows:

At the outset, the pair of field rheostats 15 and 17 and the pair of field rheostats 14 and 16 must not be operable from one direction lever, that is, clutch elements 142 must be in the position shown, the speed levers must be in the stop positions, the direction levers in the off positions, and the motor-generator change-over switch must be in the port-and-starboard position. With the levers in the positions stated and also indicated on the drawings, the operator may test the turbines by actuating the speed levers. This is usually done to ascertain whether or not the turbines are working properly before operating them under load. However, before any of the other three levers can be operated after testing the turbines, it is necessary for the operator to restore both speed levers to a place where the elongated V-shaped slots 184 and 185 register, respectively, with the bars 158 and 165.

The movement of the speed levers afforded by the base of the elongated V-shaped slots 184 and 185 allows the operation of the throttle valves 19 and 21 so that approximately 30% speed, or one-quarter speed, or less speed, may be had for the turbines while the other levers are actuated. This insures that the electrical connections of the motors and the generators are effected only at relatively low speeds.

After the speeds of the turbines are reduced to 30% speed, one-quarter speed or less, the next operation is to actuate the port and starboard direction levers to either the ahead or the astern positions, depending upon which direction the operator wishes to run the motors. This completes the electrical armature connections between the starboard motor and the starboard generator, and between the port motor and the port generator. To move the direction levers to either the ahead positions or the astern positions, the levers must be operated from the respective off positions, through the start positions, and the first run positions, to the final run positions.

While the direction levers are in the off positions, none of the field windings are energized, but discharge circuits are established for all the field windings and the power-factor correction resistor 141 is shunted. The resistor 141 is shunted because contact fingers 127 and 128 are shunted by the segment 120 on the base 116 of the motor-generator change-over switch.

The shunt or discharge circuit for the field winding 10 of the port generator may be traced from the left terminal of the field through conductor 186, resistor 187, contact fingers 97 bridged by segment 86, and conductors 188 and 189 to the right terminal of the field 10. Similarly, the discharge circuit for the field 11 of the starboard generator may be traced from the right terminal through the conductor 190, resistor 191, contact fingers 108 bridged by segments 99, and conductors 192 and 193 to the left terminal of the field 11.

The discharge circuit for the port motor field 12 may be traced from its left terminal through ammeter 139, conductor 194, discharge resistor 195, conductor 196, contact fingers 133 and 132, bridged by segment 122, conductor 197, contact fingers 90 bridged by segment 81, and conductors 198 and 199 to the right terminal of the field 12. Similarly the discharge circuit for the starboard motor field may be traced from the right terminal of the field 13 through the ammeter 140, conductor 200, discharge resistor 201, conductor 202, contact fingers 134 and 135, bridged by segment 123, conductor 203, contact fingers 115 bridged by segment 104, and conductors 204 and 205 to the left terminal of field 13.

Since the turbine speed has been reduced and the motor-generator change-over switch is in the port-and-starboard position, the direction levers may be actuated simultaneously, which is the preferred method of operation, or independently.

In the start positions and first run positions of the port and starboard direction levers, the motor field windings are still connected in closed circuit with their respective discharge circuits. The motors thus operate as straight induction motors, but, for the purpose of supplying a relatively high voltage to meet the demands of the motors when operating during acceleration as straight induction motors, the generator field windings are over-excited by applying a greater voltage to the field windings. The over-excitation, or, when desired, 200% normal excitation, is effected by connecting the generator field windings across the positive and the negative supply conductors 206 and 207, respectively, whereas for normal excitation the generator field windings are connected either across the positive supply conductors 206 and the neutral supply conductor 208, or across the neutral supply conductor 208 and the negative supply conductor 207.

The circuit for energizing the field winding 10 of the port generator, when the port direction lever is either in the ahead start position or first run position, may be traced from the positive supply conductor 206, through conductor 209, contact fingers 125, bridged by the segment 118 on base 116 of the change-over switch, conductors 188 and 189, the field winding 10, conductor 186, contact members 211 of time limit contactor 212, conductor 213, contact fingers 95, bridged by the segment 89, and conductor 214 to the negative supply conductor 207. The circuit for the field winding 10, when the port direction lever is in either the astern start position, or first run position, is exactly as just traced except that segment 84 (in lieu of segment 89) on the base 80 will bridge the contact fingers 95.

Contact members 211 of the time limit contactor 212 are held in closed position for the off position and both start positions and both initial run positions of the port direction lever. The circuit for the actuating coil of contactor 212 may be traced from the positive conductor 206, through conductor 215, contact fingers 96, bridged by the segment 85, the actuating coil of contactor 212, and conductors 216 and 217 to the neutral conductor 208.

The circuit for energizing the field winding 11 of the starboard generator, when the starboard direction lever is either in ahead, start or the first run position may be traced from the positive conductor 206, through conductor 218, contact fingers 136, bridged by the segment 124 on base 116 of the field change-over switches, conductors 192 and 193, field winding 11, conductor 190, contact members 219 of time limit contactor 220, contact fingers 110, bridged by segment 105, and conductor 221 to the negative conductor 207. The circuit for the field winding 11, when the starboard direction lever is in either the astern start or first run position, is exactly as just traced except that segment 101 (in lieu of segment 105) on base 98 will bridge the contact fingers 110.

Contact members 219 of the contactor 220 are held in closed position for the off position and both start positions and both initial run positions of the starboard direction lever. The circuit for the actuating coil of the contactor 220 may be traced from the positive conductor 206, through conductor 222, contact fingers 109, bridged by segment 100, the actuating coil and conductors 216 and 217 to neutral conductor 208.

At the beginning of the start position, since the speed of the motors is relatively low, the frequencies of the current 9 induced in the closed-circuit field windings of the motors are substantially the same at the frequencies of the currents traversing the armatures of the motors. Under this condition, the pointers of the direct-current ammeters 139 and 140 vibrate at a point near the zero readings with frequencies equal to the frequencies of the current induced in the fields 12 and 13. However, as the frequencies of the induced currents gradually decrease, the pointers of the ammeters begin to make long periodic vibrations, indicating that the speed of the motors is near synchronism. When the operator sees the pointers swing rather slowly he actuates both the direction levers to the first run positions and then to the final run positions, thus causing the motors to run as synchronous motors.

In the first run positions, the contact members 211 and 219 still being closed, the over-excitation of the generator field windings is still maintained, but the motor field windings, which were closed-circuited in the start positions, are energized from the positive and negative supply conductors 206 and 207, and have the discharge circuits open-circuited at an instant after the direct-current energization. The purpose of maintaining the generator fields at a higher excitation is to cause the generators to deliver a relatively high voltage for pulling the motors into synchronism.

The circuit for energizing the field winding 12 of the port motor, when the port direction lever is in the first ahead run position, may be traced from the positive supply conductor 206, through conductors 217 and 199, field winding 12, ammeter 139, conductor 194, the field rheostat 16, conductor 223, contact fingers 92 and 93, bridged by the segment 87, conductor 224, contact fingers 126 and 128, bridged by the segment 120, and conductor 226 to the negative supply conductor 207. During the initial stages of the first run position, the discharge circuit for the field 12 is still closed since the contact fingers 90 are still bridged by the segment 81 but as the movement of the direction lever 154 is continued, the segment 81 is moved out of engagement with the contact fingers 90 and the discharge circuit is opened and the field 12 is heavily energized by the connections explained above, but the transition is a closed-circuit transition.

When the port direction lever is moved for astern operation from the off position through the start position, the first run position and the final run astern position, the change in connections for the discharge circuit is the same as for the ahead positions but the field rheostat is shunted in the start position and remains shunted in the two run positions. The port motor field is thus heavily excited for astern operation.

The circuit for energizing the field winding 13 of the starboard motor, when the starboard direction lever is in the first ahead run position, may be traced from the positive supply conductor 206 through conductors 217, 216 and 205, field winding 13, ammeter 140, conductor 200, rheostat 17, conductor 228, contact fingers 112 and 113, bridged by segment 107, conductor 225, contact fingers 128 and 130, bridged by segment 120, and conductor 226 to the negative supply conductor 207. During the initial stages of the final run position, the discharge circuit for the field 13 is still closed, since the contact fingers 115 are still bridged by the segment 104, but as the movement of the starboard direction lever 156 is continued the segment 104 is moved out of engagement with the contact fingers 115, thus opening the field discharge circuit. The field 13 is heavily energized by the circuit explained above, but, as should be apparent from the preceding explanations, the transition is a closed-circuit transition.

When the starboard direction lever is moved for astern operation from the off position through the start, the first run position to the final run position in the astern direction, the change in connections for the discharge circuit is the same as for the ahead positions, but the field rheostat is shunted in the start position and remains shunted in the two run positions. The starboard motor field 13 is thus heavily excited for astern operation.

When the direction levers for both port and starboard machines are shifted to the final run positions ahead, the energizations of the motor fields remain the same as they were in the first run positions but the energization of the generator fields is reduced to normalcy. In this final run position for the port generator, the contact members 211 of the time-limit contactor 212 open in a short substantially fixed interval of time, and the field 10 is connected between positive conductor 206 and the neutral conductor 208 through the rheostat 14. In other words, the circuit for the field 10 is completed from conductor 186 through the over-excitation control resistor 229, the rheostat 14, conductor 230, contact fingers 94, bridged by segment 88, and conductor 231 to the neutral conductor 208. For the starboard generator in the final run position, the field 11 is connected across the negative supply conductor 207 and the neutral conductor 208, because the contact members 219 of the time-limit contactor 220 open in a short substantially fixed interval of time. In other words, the energized conductor 190 connected to the right terminal of field 11 is connected to the positive conductor 206 through the over-excitation control resistor 232, rheostat 15, conductor 233, contact fingers 111, bridged by segment 106, and conductor 234 all connected in series.

As hereinabove explained, the motor field windings are automatically over-excited for astern operation to avoid any possibility of losing propeller power, that is, to avoid the possibility of unstable operation. The over-excitation, as explained, is effected by the shunting of the rheostats 16 and 17. The stability does not, however, depend on the motor field excitation only and, to correspondingly over-excite the generators, I make provision for shunting the over-excitation control resistors 229 and 232. To shunt resistors 229 and 232, the operator, when he is about to move the direction levers to the astern direction, merely closes switches 235 and 236, thereby energizing the electromagnetic switches 237 and 238, respectively, which thus shunts the resistors 229 and 232, respectively.

As shown, the time-limit contactors 212 and 220 have a predetermined time constant and thus insure that the circuits for over-excitation of the generator fields remain closed while the circuits for normal excitation of the generator fields are being closed. The transition from over-excitation to normal excitation is thus made on closed circuit.

After the direction levers are actuated to the final run positions, regardless of whether in the ahead or the astern direction, the speed of the turbines may be increased to any desired value by operating the speed levers. The speed levers are free to move after the movements of the direction levers are complete, because if both levers are moved to the final ahead run positions, V-shaped notches 179 and 182 on bars 154 and 156, respectively, register with bars 158 and 165, which bars are thus free to move out of the notches 184 and 185, respectively, thus releasing the speed levers. On the other hand, if both direction levers are moved to the final astern run position, V-shaped notches 180 and 183 register with bars 158 and 165, so that the speed levers are again free to move.

The movement of the direction levers is not limited to a simultaneous ahead movement or a simultaneous astern movement, but they may be moved successively. Further, the operator may even desire to operate one motor for ahead operation and the other for astern operation. To accomplish this, the direction levers are moved in opposite directions from their off positions. If bar 154 be moved to the ahead position and bar 156 to the astern position, a right turn may be effected, and V-shaped notch 179 registers with bar 158 when V-shaped notch 183 registers with bar 165. If bar 154 is moved to astern position and bar 156 is moved to ahead position, a left turn is effected, but in this case V-shaped notch 180 registers with bar 158 when V-shaped notch 182 registers with bar 165.

To maintain substantially uniform stability over the entire speed range the rheostats 14 and 16 for the port generator field and port motor field, respectively, are connected to be operated by the port speed levers and the rheostats 15 and 17 for the starboard generator field, and starboard motor field, respectively, are coupled to be operated by the starboard speed lever. The mechanical coupling is such that as the speed is increased more and more the field circuit resistances become less and less. In other words, the excitation of both the motors and both the generators is increased more and more with higher and higher speeds.

While it is extremely important that stable operation be maintained for all speeds it is still more important that the operations be stable at the lower speeds. By a proper design of the mechanical connections between the speed levers and the rheostats or the rheostats only, or both, with reference to the speed changes effected for a given movement of the speed lever, the margin of stability can be increased for the lower speeds. In other words, the excitation increases with reference to the speed as the speed decreases.

In this disclosure it is assumed that a given throw of the speed lever produces a corresponding change in speed, that is, the speed is proportional to the speed lever setting. This is, with modern speed control means, very nearly true in actual practice. In view of such operating characteristics of the speed control means, the rheostats themselves show that the margin of stability is increased with a decrease in speed.

By the proper design of the cooperative action of the speed levers and the rheostats, stability is automatically maintained, and the stability even increases with a decrease in speed. Further, a stability meter is not needed because the attendant can get all the information he needs from the readings of the ammeters 139 and 140.

In the event that the operating conditions call for approximately 75% of full speed, representing approximately one-half of full load, it is desirable, in the interest of economy, to operate both of the motors from either one of the generators. This change may be effected in the following manner:

First, the speed of the turbines is reduced until the notches 184 and 185 register with the transversely disposed bars 158 and 165, thus freeing the direction levers. Second, the direction levers are moved to their off positions which disconnects the motors from the generators, deenergizes the fields and also connects the fields to their respective discharge circuits. When the direction levers are in their off positions, as shown, the motor-generator change-over switch is free to move and the attendant or operator can move the bar 155 either to the port position or the starboard position, depending upon which generator he desires to connect to both motors.

It will be assumed that the operator desires to operate both motors from the port generator, in which case the bar 155 is moved to the port position. In this position the V-shaped notches 168 and 171 register, respectively, with the V-shaped ends of the transversely disposed bars 160 and 163, respectively. For the assumed control the circuit arrangement must be such that both motors and the port generator can be controlled from the port direction lever. To this end, the starboard direction lever is shifted either to the ahead position or the astern position, depending on the direction in which the attendant wishes to operate the motors, or the direction the vessel is to travel. If bar 156 is moved to the full ahead position, or final ahead run position, V-shaped notch 239 registers with the bar 164 and, in consequence, the port direction lever, or bar 154, is free to move either to the ahead position or astern position.

If bar 156 is not in either the off position or the two final run positions, the right end of bar 164 will ride on the left surface of bar 156 and the pivoted block 176, being intermediate the adjacent ends of bars 161 and 164, will force the port end of bar 161 into the V-shaped notch 240. When the bar 156 is in the final astern run position, V-shaped notch 241 will register with bar 164 and thus permit free movement of bar 154.

Once the desired operations of bar 156 have been effected and the bar 154 has been operated, no further operations of bar 156 can be made, because the port end of bar 161 would ride on the right surface of bar 154.

Operation of the motor-generator change-over to the port position connects both motors to the port generator. A mere inspection of Fig. 2 shows what these circuits are, and these circuits need, therefore, not be traced in detail.

Operation of the port direction lever from the off position to the respective start positions, first run positions and final run positions successively establishes the same circuits for the field windings of the port motor and the port generator as for independent control. The circuits need, therefore, not be again traced in detail.

Since the starboard motor field is to be subject to the control of the port direction lever, the successive circuits established for the starboard motor are different for different positions of the port direction lever than for corresponding positions of the starboard direction lever when controlling the machines on each side independently.

With the starboard direction lever, or bar 156, in the final ahead run position and the port direction lever 154 in the off position the discharge circuit for the starboard motor field 13 may be traced from the right terminal of the field through the ammeter 140, conductor 200, discharge resistor 201, conductor 202, contact fingers 134 and 132, bridged by the segment 122, conductor 197, contact fingers 90 bridged by segment 81, and conductors 198, 216 and 205 to the left terminal of the field 13.

As the port direction lever is moved to the ahead start position both motors start as induction motors. In the initial stages of the first run position, the discharge circuits for both the port and starboard motor are still closed, but both fields are connected for heavy excitation across the positive and negative supply conductors 206 and 207. The circuits for the fields of the port generator and port motor are clear from previous discussions. The field energization 13 of the starboard motor takes place through operations of the port direction lever. In the first run position, the field 13 is connected to conductors 206 and 207 by the series circuit through conductors 217, 216, 205, the field 13, ammeter 140, conductor 200, rheostat 17, conductor 228, contact finger 113, conductor 242, contact fingers 130 and 131, bridged by segment 119, conductor 243, contact fingers 92 and 93 bridged by segment 87, conductor 224, contact fingers 126 and 127, bridged by segment 120, and power-factor corrective resistor 141 to conductor 207.

When the port direction lever is in the astern position, contact fingers 92 and 93 will, of course, be bridged by segment 82 and the rheostat 16 of the port motor will be shunted. If the starboard direction lever is also in the astern position, the rheostat 17 will, of course, also be shunted.

Figure 8:
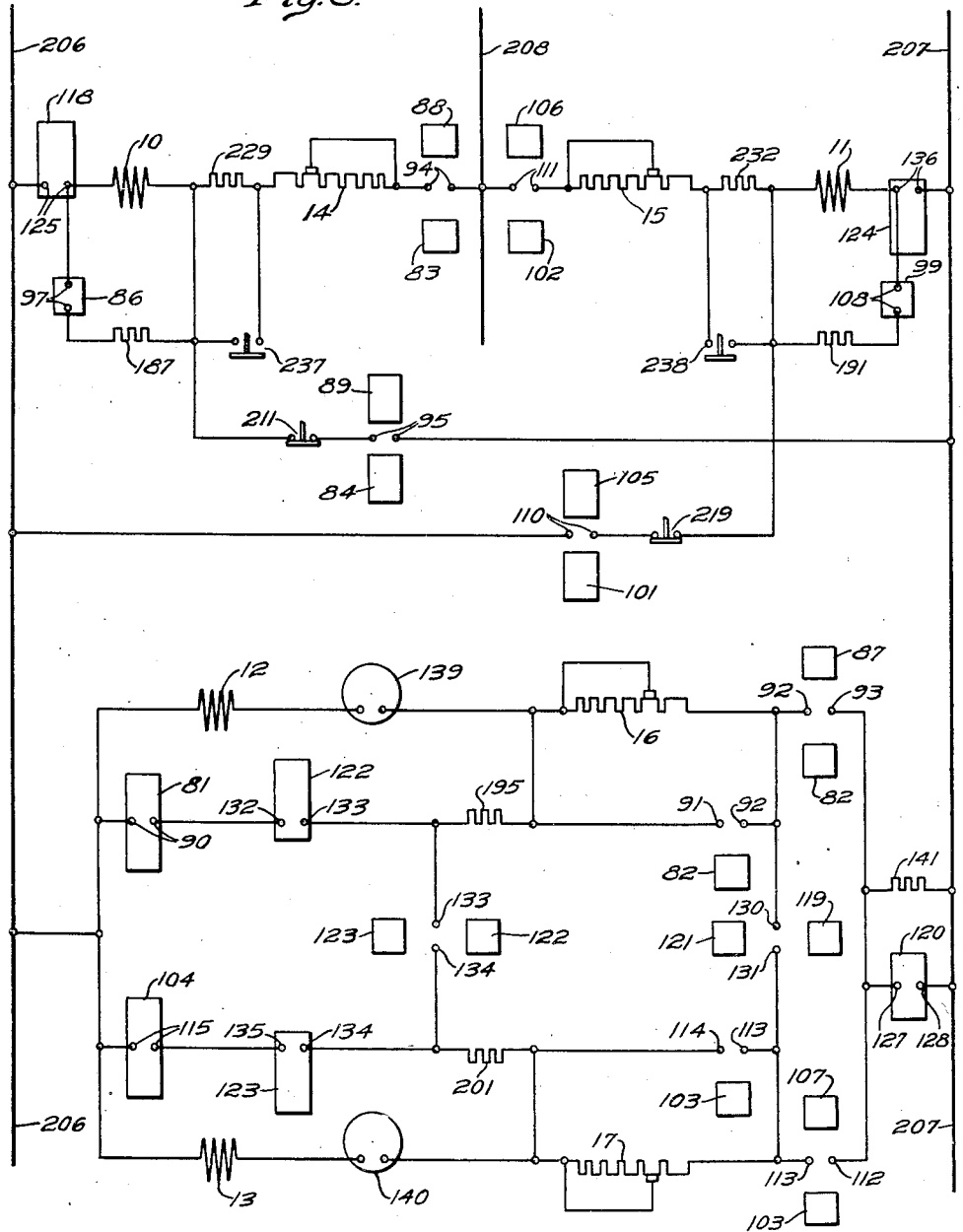
Fig. 8 is a straight line diagram of the field control for the generators and motors shown in Figs. 1, 2 and 3.

The straight line diagram illustrated in Fig. 8 clearly shows how the various circuits heretofore explained may be established. For instance, the circuit above traced on Figs. 1 and 2 for field 13 may be readily traced on Fig. 8 by merely following the numbers 206, 13, 140, 17, 131, 119, 130, 92, 93, 87, 141 and 207. All of the circuits hereinbefore traced, when relating to the fields of the generators and the motors, may be very readily traced on Fig. 8.

The various circuits for the motor and generator fields for all the operations that may be selected may be very readily followed from a study of the sequence chart shown in Fig. 7 and a study of the straight line diagram shown in Fig. 8.

Once the two motors have pulled into synchronism, both operating either in the ahead direction or the astern direction, or one operating in the ahead direction and the other in the astern direction, the port speed lever may be actuated to increase the speed of the port turbine. To automatically maintain stable operation, both field rheostats may be connected to be operated from the port speed lever. This is accomplished by the clutch members 142 by means of which the port and starboard speed levers may be simultaneously operated. Since no steam is admitted to the starboard turbine, operation of the valve 21 is of no import and the starboard speed lever controls only the rheostat 17, whereas the port speed lever controls both the steam admission to the port turbine and the rheostat 16.

When the starboard generator only is to be used, the change-over lever, or bar 155, is moved to the starboard position so that V-shaped notches 166 and 169 register with the bars 160 and 163, and the pivotally mounted block 174 is interposed between the adjacent ends of transversely disposed bars 159 and 162.

When block 174 is intermediate the adjacent ends of bars 159 and 162 and the port direction lever is not in the off position or in either of the final run positions, the starboard direction lever cannot be operated. However, when bar 154 is in the off position, the V-shaped notch 175 registers with bar 159; when it is in the final ahead run position, V-shaped notch 244 registers with bar 159; and in the final astern run position, V-shaped notch 245 registers with bar 159. In all these three positions, the starboard direction lever may be actuated to all its positions.

The control for both the starboard machines is exactly like the control for independent operation or interconnection of the respective machines.

The successive field circuits for the field motor, with different positions of the starboard direction lever when the starboard generator only is used, will correspond exactly to the successive field circuits heretofore explained for different positions of the port direction lever when the port generator only was used. To also trace these circuits in detail should not be necessary, since a mere inspection of Figs. 1, 2, and 8 in the light of explanations hereinbefore given should be a complete disclosure to one skilled in the art.

It should be noted that contact fingers 127 and 128 are bridged only in the port-and-starboard position of the change-over switch, with the result that the power-factor corrective resistor 141 is connected in the motor field circuits when only one generator is used, thus preventing an excessively leading power factor.

As will be observed, by the combination of the motor-generator change-over switch and the direction switches, the starboard generator only may be connected in circuit relation with the port motor only and, conversely, the port generator only may be connected in circuit relation with the starboard motor only. The starboard generator only is connected in circuit with the port motor only, when the motor-generator change-over switch is in the starboard position, the starboard direction switch is in the off position and the port direction switch is in one of its positions other than the off position. Similarly, the port generator only is connected in circuit with the starboard motor only, when the motor-generator change-over switch is in the port position; the port direction switch is in the off position; and the starboard direction switch is in any one of its positions other than the off position.

In practice, the operation of the starboard generator only with the port motor only, or the port generator only with the starboard motor only, is rather infrequent, usually being done in case of necessity in making repairs upon either one of the two motors or upon either one of the two generators.

In the embodiment hereinbefore described and shown in Figs. 1 to 8, inclusive, no provision is made to insure the proper synchronization of the motor driving the propeller when this motor is transferred from induction-motor operation to synchronous-motor operation. In most industrial applications, no provision is made to vary the frequency of the energy supplied to a synchronous motor when operating as an induction motor, and the induction-motor characteristics must be so selected with reference to the characteristics of the load that synchronization takes place.

In ship propulsion, it is known that the load characteristics of a propeller are such that the torque rises very rapidly with increases in speed. In Fig. 13, curve 250 shows the torque characteristics of one of the motors driving the propeller when operating as an induction motor, and shows how the torque varies from a given high value to zero at zero percent slip. The curve 251 illustrates the torque characteristics of the propeller, and, for the operation assumed, shows the variation in torque from 100% in a given direction, to some high percent when operating in an opposite direction. If it be assumed that the propeller motor is to be reversed, the torque of the propeller will at first drop from 100% to zero torque at about 70% of full speed, at which speed the propeller will simply rotate at a speed determined at each instance by the speed of the ship. To rapidly reverse the ship, the speed of the propeller must be still further decreased, and, in consequence, the torque again rises to very near 100% and then drops to somewhere near 20% at zero speed. At or near zero speed, the directional switches will, of course, be operated and the propeller will start to operate in an opposite direction, and it will be noted that the torque rises very abruptly, since the torque of the propeller increases as the square of the speed.

While the propeller goes through these variations of torque, the torque of the motor drops, as indicated by curve 250 in Fig. 13, and at or near 30% of full speed in the opposite direction, when the transfer is to be made from induction-motor operation to synchronous-motor operation, the torque will be zero. However, at the transfer, when the speed will be about 95% of synchronous speed, the torque of the motor will be low or have a value indicated by the ordinate 249. It will be noted that the propeller torque will have a value indicated by the ordinate 252, a value much higher than the torque the motor can develop, and, in consequence, the motor is not likely to pull into synchronism and thus may continue to slip. The result is that the motor continues to operate as an induction motor, and 30% speed cannot be maintained, but a speed of only 18 or 20% of full-load speed will be maintained.

One of the outstanding features of the additional control means disclosed in Figs. 9 to 13, inclusive, is to vary the speed of the turbine and thus the frequency of the generator, when the transition from induction-motor operation to synchronous-motor operation is to be made, in such a direction that the motor and generator will fall into synchronism and the motor will not be required to pull into synchronism. This will be apparent from the fact that the motor will operate at a portion of its torque characteristic curve indicated by the ordinate 253. The propeller torque at such time will be indicated by the ordinate 248, which is of course less than the torque indicated by the ordinate 253.

For example, if the admission of steam to the turbine be so adjusted that it is operating at 30% of full speed, then the induction motor will operate the propeller to within 95% of synchronous speed at the said 30% of full speed. If the generator speed, at the instant of transfer, be decreased by a few percent and the frequency, of course, correspondingly decreased, the generator frequently will be decreased to such a value that the motor will, in fact, run at synchronous speed for the new frequency when operating at 95%, as assumed, of the 30% of full speed. The result is that the motor will fall into synchronism, and since the field windings of the motor are excited at this same instant when the frequency of the generator is decreased, no difficulty whatsoever is experienced in synchronizing the motor operated by the generator.

To accomplish these novel results, I have disclosed mechanical means shown in Figs. 9, 10 and 11 for automatically effecting the proper synchronization of the motor driving a propeller, and in Fig. 12 I have shown electrical means for automatically effecting proper synchronization of the motor when transferring from induction-motor operation to synchronous-motor operation.

In Fig. 9, I have shown the mechanical features in perspective, and certain features removed from their normal positions merely for the purpose of clarity. Furthermore, I show only the direction lever 154 and the speed lever 153 on the port side of the control without duplicating the starboard side of the control. It is, of course, understood that the speed lever 153 may be interlocked with the speed lever on the starboard side exactly as shown in Fig. 3. The mechanical system of control is thus not limited to a single generator and a single motor, but is adapted to be used with the system of control shown and described in connection with Figs. 1, 2, and 3.

It should also be noted that the bar or speed lever 153 is provided with the elongated slot 184 and that the direction lever 154 is provided with V-shaped notches 178, 179 and 180, and that transversely disposed bar 158 is adapted to cooperate with the notches at the port side of the direction lever 154 and the elongated notch 184 at the starboard side of the speed lever 153 in exactly the manner heretofore explained in connection with the discussion of Fig. 3. The V-shaped notches and the transversely disposed bars disposed at the starboard side of direction lever 154 are not shown.

The mechanical means for automatically controlling the turbine speed and thus the frequency of the generator to insure proper synchronization, consists of two attachments comprising the elements cooperating respectively with bars 255 and 274. Bar 255 has an elongated slot 256 running longitudinally thereof, which slot has a pair of cams 257 and 258 adapted to cooperate respectively with gear teeth 260 and 261 on the gear wheel 259. The gear wheel 259 is suitably mounted on a shaft rigidly secured in the bearing 268, shown in Fig. 11, but the shaft itself is not shown so as not to obscure the more essential features of my invention. The gear wheel 259 is adapted to operate a sector 262 carrying the spring biased tooth 263. It will be noted, from an inspection of Fig. 9, that, regardless of whether the bar 255 is moved forwardly or backwardly, the gear wheel 259 will always rotate in a clockwise direction. If moved forwardly, the cam 258 will operate on the gear tooth 261 to produce a clockwise rotation, whereas if the bar 255 is moved backwardly, cam 257 operates on gear tooth 260 to produce a clockwise rotation.

The spring biased tooth 263 has the spring 264 mounted in the sector 262 to always urge the tooth 263 to its maximum outward position. A plate 265 having a pair of pins 266 retains the tooth 263 in position. The pair of pins are disposed on opposite sides of a flat spring 267 mounted on the bearing 268, and operates to move the gear wheel 259 to the position shown in Figs. 9 and 11 when not held in a given position by the cams in the bar 255.

The outer end of the tooth 263 is adapted to cooperate with an elongated slot 270 in the lug 269, which lug is rigidly secured to the speed lever 153. The elongated slot 270 is of the same depth at the forward, or, in Fig. 10, left-hand end of the slot, as the depth of the slot 184, but at the left-hand end, or rear end of the slot, the depth is considerably less than the depth of the slot or notch 184. The purpose of this will be apparent presently from a discussion of the attachment actuated by the bar 274.

The bar or directional lever 154 has a handle 254, and is provided with a notch 291 adapted to cooperate with a latch or dog 290 pivotally mounted on the bar 255. The bar 255 is provided with a handle 287, and a manually operable detent 288 which is spring biased to such a position by the spring 289 to always urge the dog 290 into the notch 291. When the dog 290 is disposed in the notch 291, the bar 255 will move back and forth with operations of the direction lever 154. In fact, it then becomes immaterial whether the attendant operates the direction switch by the use of handle 254 or the handle 287.

If the attendant wishes to disengage the bar 255 from the direction lever 154, he merely actuates the thumb pieces 288, or 293, depending upon whether or not he wishes to operate the bar 255 or the direction lever 154. Once the thumb pieces are operated, the latching mechanism 292 retains the dog in the disengaged position shown. However, a mere depression of the latching means 292 will release the dog 290 to cause rapid interconnection between the bar 255 and the direction lever 154.

Normally, the tooth 263, acted upon by the spring 267, is in the position shown in Figs. 9 and 11, and is disposed in the slot 270. Operation of the direction lever 154, assuming the normal arrangement when dog 290 engages the notch 291, will cause clockwise rotation of the gear wheel 259, and, in consequence, the tooth 263, see Fig. 10, will move the speed lever 153 to the position indicated by the dot-and-dash line 273. The tooth 263 will thus be moved into a position to completely clear or disengage the block 269 and will be retained in the position indicated in Fig. 10 by reason of the fact that the gear teeth 260 and 261 will ride on the surface or edges 295 and 296 of the slot 256. The spring 267 will, therefore, move the tooth 263 to the positions shown in Figs. 9 and 11, namely, a vertical position, as viewed in Fig. 10, only when the bar 255 is in the position indicated in Fig. 9.

When the sector 262 and thus the tooth 263 are moved in a clockwise direction, the speed lever 153 being moved forwardly will thus admit steam to operate the turbine and the generator at approximately 30% of full speed.

The bar 274 is shown somewhat raised or removed from the bar 255 in Fig. 9, but in actual practice it will be rigidly secured to the bar 255, and by reason of its spacing or its somewhat U-shaped form provides a spacing for the bearing 268 between the gear wheels 259 and 279.

The bar 274 is provided with a slot 297 having the cams or gear teeth 275 and 276 adapted to cooperate with gear teeth 277 and 278 of the gear wheel 279. Regardless of whether the bar 274 is moved forwardly or backwardly, the sector 280 on the gear wheel 279 and thus the spring biased tooth 281, will be operated in a counter-clockwise direction. The counter-clockwise movement is, however, not accomplished until the direction lever 154, to which the bar 274 will be secured or with which it will move, is moved to the full operative position. Or, as indicated in Fig. 3, the counter-clockwise movement takes place only when the bar 154 is moved to the full astern run position or full ahead run position. It will be remembered that such movement of the direction lever 154 changes the connection of the motor control from induction-motor operation to synchronous-motor operation. It is, therefore, necessary, to insure proper synchronization, that the speed of the turbine and thus the frequency of the current supplied to the motor be decreased at the instant the transition is made from induction-motor operation to synchronous-motor operation. Normally, the sector 280 and thus the tooth 281 is held in the position shown in Figs. 9 and 11 by the spring 285, also mounted upon the bearing 268 and cooperating with a pair of pins 284 on the sector 280. The tooth 281 is similar in structure to the tooth 263, except that its cam surface slopes in an opposite direction. A plate 283, similar to the plate 265, retains the tooth 281 in position.

Movement of the direction lever 154 to either of the two run positions actuates the tooth 281 in a counter-clockwise direction, see Fig. 10, and since the tooth 263 has just prior to such movement operated the speed lever 153 to the position indicated by the dot-and-dash line 273, the tooth 281 will be at the rear end of the slot 270, and thus forcibly move the speed lever 153 backwardly a slight amount, to the full-line position 272 shown in Fig. 10, thereby decreasing the speed of the turbine and thus the frequency of the generator by an amount sufficient to permit the motor to fall into synchronism. The dotted line 271 shows the position of the bar 153 when not at all acted upon by the teeth 263 and 281. Since the depth of the slot at the rear end is not great, the tooth 281 will soon clear the slot and be held in the position indicated in Fig. 10 by reason of the fact that the gear teeth 277 and 278 are held in the position shown in Fig. 10 by the cams 275 and 276. It will thus be apparent that as soon as the speed of the turbine has been decreased to permit the motor to fall into synchronism, both teeth 263 and 281 are moved out of engagement with the slot 270, and thereafter the speed lever may be freely moved to the full speed position.

Assume for the moment that my invention is applied only to a single generator and a single motor to simplify this discussion, and that the attendant wishes to start the ship. Further, assume the boiler pressure is normal, but that the turbine has not yet been heated. The attendant thereupon grasps the handle 287, moves the thumb piece 288 so as to disengage the direction lever 154 from the bars 255 and 274. The latching arrangement 292 will hold the dog 290 in the position indicated. The attendant thereupon moves the handle 287 either forwardly or backwardly through its full-throw at a speed he may find convenient, and, in consequence, the speed of the turbine is increased to about 30% of its full speed and thereafter decreased by a slight amount by the successive action of the teeth 263 and 281, and the teeth are thus moved into the position shown in Fig. 10. The turbine may, therefore, be brought up to full speed by appropriate operation of the speed lever 153 without being in anywise hampered in its operation by the attachments shown nor by the bar 158, since, under the assumed conditions, the direction lever 154 is in the position shown in Fig. 9.

Regardless of the position that the speed lever may occupy at this instant, once it has been moved to some speed higher than 30%, the bars 255 and 274, being rigidly secured to each other, may be moved back to the off position and the dog 290 may be released by depressing the button or latching member 292. The attachments are thus secured to the direction lever 154, and since the left-hand or port end of the bar 158 may rest on the surface or starboard edge of the speed lever 153, the direction lever cannot be operated unless the speed of the turbine is decreased to 30% speed or less. When the speed lever is returned to the low speed position, the spring biased teeth 263 and 281 will move into the slot 270 by the operation of the springs 264 and 282.

The attendant may now operate the direction lever 154, and by so doing, he automatically increases the speed of the turbine to 30% of its full speed, if it is not already at that speed, and when moved to the full-run position, regardless of whether such position be for forward or ahead operation or astern operation, the speed of the generator driven by the turbine is decreased by the operation of the tooth 281, and the motor falls into synchronism. In the full operative position of the direction lever 154, the teeth 263 and 281 will be in the position shown in Fig. 10, the motor will have become synchronized, and the turbine speed may be freely varied by appropriate operation of the speed lever 153 without interference by the teeth 263 and 281.

The interlock 158, as was explained in connection with the discussion of Fig. 3, prevents the operation for the direction lever 154, unless the speed of the turbine is decreased to 30% of full speed or less, but since the speed lever may take any position from 30% speed to zero speed, it follows that when the direction lever 154 is moved to the off position, teeth 263 and 281 will not necessarily, by the very nature of the speed lever 153, move into the slot 270. Since, however, these teeth are provided with slanting or camlike surfaces and are spring actuated, there will be no difficulty in causing the teeth to move into the position shown in Figs. 9 and 11, in which position, regardless of whether the turbine be operated to 30% speed, zero percent speed, or some intermediate speed, they will enter the slots 270.

In some respects, the electrical means shown in Fig. 12 are simpler than the mechanical features for accomplishing the novel results herein explained in connection with the discussion of Figs. 9, 10 and 11.

A study of Fig. 12 will show that the forward end of the speed lever is provided with an armature 301 cooperating with the solenoid 300. The speed lever operates the field rheostats 14 and 16 in exactly the manner heretofore explained in connection with the discussion of Figs. 1 and 2. The solenoid includes two coils for operating the armature 301, one coil extending from the junction 304 to the junction 305, and the other coil extending from the junction 306 to the junction 307. When one or the other coil is energized, the armature 301 will move so that the midpoint of the armature will be at the midpoint of the coil. As will be readily apparent from an inspection of Fig. 12, the midpoints of the coils are at different points. It is, therefore, clear that when the coil included between junctions 304 and 305 is energized, the armature 301 will move to a given forward position, and when the coil included between the junctions 306 and 307 is thereafter energized at the instant the first coil is deenergized, the armature 301 will move back by a small amount. Since the armature 301 is secured to the speed lever 153, the energization of the solenoid 300 between the junctions 304 and 305 will move the speed lever to such a position as to produce about 30% full speed of the turbine, and that energization of the coil included between the junction 306 to junction 307, when the first-mentioned coil is deenergized, will decrease the speed of the turbine and thus the frequency of the generator so that the motor connected to the generator will automatically fall into synchronism.

The energization of the solenoid 300 is controlled from the direction lever, not shown, but which lever operates the base 80, operating the other field switches mounted on the base 80 of the directional switch 7. The directional switch 7 is, in the modification shown in Fig. 12, provided with an additional pair of segments 311 and 316 and is disposed to cooperate with the stationary contact fingers 309, 310 and 313.

If the attendant wishes to start the motor, he operates the direction lever from its off position and immediately after he moves the direction lever from the off position, a circuit is established from the positive conductor 206, through conductor 303, the coil included between the junctions 304 and 305, conductor 308, contact fingers 309 and 310, bridged by either the segment 311 or 316, depending upon whether or not the attendant intended to operate in the forward direction or in the reverse direction, and conductor 312 to the neutral conductor 208. The armature 301 will thus be actuated to a position to insure about 30% of normal or full speed of the turbine. As the motor coupled to the generator increases in speed, operating as an induction motor, the base will, of course, move through the start position, the full run position, and then the final run position. At the time that the base 80 is moved to such a position that the direct-current excitation is supplied to the motor, the circuit for coil included between the junctions 304 and 305 is interrupted at the contact finger 309, and a circuit is established from the neutral conductor 208 through conductor 312, contact fingers 310 and 313, bridged by either the segment 311 or 316, depending upon the direction of operation of the base 80, conductor 314, the coil included between the junctions 306 and 307, and conductor 315 to the negative conductor 207. It will be noted that the energization of the coil included between the junctions 306 and 307 is in a direction opposite to the first energization of the coil included between the junctions 304 and 305. This reversal of the current with reference to the magnetic circuit, insures that the magnetism is reversed and thus passes through a zero stage. There is thus no danger that the armature 301 will be caused to stick in a given position by reason of the initial operation, and in consequence, the armature 301 will be moved backwardly a slight amount, thereby decreasing the speed of the turbine and thus the frequency of the generator, with the result that the motor automatically falls into synchronism.

I have disclosed a system of control which provides for selectively connecting any number of a plurality of synchronous motors in circuit relation with any number of a plurality of generators, at the same time automatically controlling the stability as a function of the speed, and maintaining substantially unity power factor regardless of the circuit arrangements selected.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A control system comprising, in combination, an alternating-current generator, a synchronous motor for driving a load, means for connecting the motor to the generator, means for driving the generator, means for varying the speed of the generator driving means, thereby varying the speed and the load of the motor connected to the generator, a field winding for the generator and a field winding for the motor, means, mechanically coupled to the means for interconnecting the generator and the motor, adapted to establish a plurality of successive operating circuits for the field windings of both the generator and the motor, and means for varying the excitation of the field windings with variations of speed of the driving means for the generator.

2. A control system comprising, in combination, an alternating-current generator, a synchronous motor for driving a load, means for connecting the motor to the generator, means for driving the generator, means for varying the speed of the generator driving means, thereby varying the speed and the load of the motor connected to the generator, a field winding for the generator and a field winding for the motor, means, mechanically coupled to the means for interconnecting the generator and the motor, adapted to establish a plurality of successive operating circuits for the field windings of both the generator and the motor, a rheostat for each field winding having arms and designed to have greater variations in resistance values for the initial positions of the arms than for other positions, and means for coupling the arms to the speed-varying means.

3. A control system comprising, in combination, an alternating-current generator, a synchronous motor for driving a load, means for connecting the motor to the generator, means for driving the generator, means for varying the speed of the generator driving means, thereby varying the speed and the load of the motor connected to the generator, a field winding for the generator and a field winding for the motor, means mechanically coupled to the means for interconnecting the generator and the motor for establishing a plurality of successive operating circuits for the field windings of both the generator and the motor, a rheostat for each field winding, having arms and designed to have greater variations in resistance values for the initial positions than for other positions of the arms, means for coupling the arms to the speed-varying means, and means for interlocking the means mechanically coupled to means for interconnecting the generator and motor and the speed-varying means, said interlocking means being adapted to release the speed-varying means for operation only after the last circuit of the successive operating circuits has been established.

4. A control system comprising, in combination, an alternating-current generator, a field winding therefor, a rheostat having an arm and adapted to decrease the effective resistance of the field winding less and less rapidly for equal movements of the arm as the resistance is decreased, a synchronous motor, a field winding therefor, a motor field rheostat having an arm and adapted to decrease the effective resistance of the field winding less and less rapidly for equal movements of the arm as the resistance is decreased, means for energizing the field windings, switching means for interconnecting the generator and motor, means for driving the generator, speed-varying means for the generator-driving means adapted to effect substantially proportional changes in speed for equal movements of the speed-varying means, coupling means interconnecting the rheostat arms with the speed-varying means to move the arms equal amounts for equal movements of the speed-varying means, and means for restricting the operation of the speed-varying means to certain limits at the time said field windings are energized.

5. A control system comprising, in combination, an alternating-current generator, a field winding therefor, a synchronous motor, a field winding therefor, main switching means adapted to connect and disconnect the motor with the generator, a source of direct current, field switching means adapted to connect and disconnect the field windings with the source of direct current, means for varying the excitation of both field windings, driving means for driving the generator, speed-varying means for the driving means, and means adapted to restrict the operation of said speed-varying means to certain limits when both said switching means are in open-circuit position.

6. A control system comprising, in combination, an alternating-current generator, a field winding therefor, a synchronous motor, a field winding therefor, main switching means adapted to connect and disconnect the motor with the generator, a source of direct current, field switching means adapted to connect and disconnect the field windings with the source of direct current, means for varying the excitation of both field windings, driving means for driving the generator, speed-varying means for said driving means, means adapted to restrict the operation of said speed-varying means to certain limits when both said switching means are in open-circuit position, means adapted to vary the excitation of said field windings with the variations in speed of said means for driving the generator, and means included with said last-named means for increasing the excitation of both said field windings with reference to the speed of the driving means as the speed decreases.

7. A control system comprising, in combination, an alternating current generator, a field winding therefor, a generator field rheostat having an arm, a synchronous motor, a field winding therefor, a motor field rheostat having an arm, switching means for connecting the motor to the generator, means for exciting the field windings, driving means for the generator, means adapted to simultaneously decrease the excitation of the field windings by appropriate operation of said rheostat arms and decrease the speed of said driving means, and means adapted to prevent operation of the last-named means only when the speed-varying means is in certain operative positions.

8. A control system comprising, in combination, an alternating-current generator, a field winding therefor, driving means for the generator, speed-varying means for the driving means, a source of direct current, a synchronous motor, a field winding therefor, main switching means adapted to connect and disconnect the motor with the generator, field switching means adapted to connect and disconnect the source of direct current with the field windings of both the generator and the motor, interlocking means, between the main switching means and the field switching means, adapted to effect simultaneous operation of said main switching means and said field switching means and interlocking means between the speed-varying means and both of said switching means to prevent the operation of both said switching means except when said speed-varying means is in certain positions of low speed for the driving means.

9. A control system comprising, in combination, an alternating-current generator, a field winding therefor, driving means for the generator, speed-varying means for the driving means, a source of direct current, a synchronous motor, a field winding therefor, main switching means adapted to connect and disconnect the motor with the generator, field switching means adapted to connect and disconnect the source of direct current with the field windings of both the generator and the motor, interlocking means, between the main switching means and the field switching means, adapted to effect simultaneous operation of said main switching means and the field switching means, interlocking means between the speed-varying means and both of said switching means to prevent the operation of both said switching means except when said speed-varying means is in certain positions of low speed for the driving means, means for simultaneously varying the excitation of both field windings with variations in speed of the driving means, and means included with said last-named means for increasing the excitation of both said field windings with reference to the speed of the driving means as the speed decreases.

10. A control system comprising, in combination, a plurality of alternating-current generators, a plurality of synchronous motors for driving a load, means for selectively connecting any one of the motors in circuit relation with any one of the generators, means for driving each generator, means for varying the speed of each generator-driving means, thereby varying the speed and the load of the selected motor that may be connected in circuit relation with the selected generator by the selective connecting means, a field winding for each generator and each motor, means for energizing the field windings of only the selected generator and the selected motor, means adapted to simultaneously vary the excitation of the field windings of the respectively selected generator and motor with variations in the speed of the driving means for the generator, and means adapted to prevent interconnection of the selected generator with the selected motor and the energization of the field windings of the generator and motor selected when said speed-varying means is in any position other than certain predetermined positions.

11. A control system comprising, in combination, a plurality of alternating-current generators, a plurality of synchronous motors for driving a load, means for selectively connecting any number of motors in circuit relation with any one of the generators, means for driving each generator, means for varying the speed of each generator-driving means, thereby varying the speed and the load of the selected motors that may be connected in circuit relation with the selected generator by the selective connecting means, a field winding for each generator and each motor, means for energizing the field windings of only the selected generator and the selected motors, means for simultaneously varying the excitation of the selected generator and the selected motors with variations in speed of the generator-driving means, and means adapted to prevent the interconnection of the generator with the motors and the energization of the field windings of the generator and the selected motors except when certain elements of the speed-varying means are in selected positions.

12. A control system comprising, in combination, an alternating-current generator, a synchronous motor, a second alternating current-generator, a second synchronous motor, a motor generator selective means, adapted, in the first position, to connect the first-mentioned motor in circuit relation with the first-mentioned generator and the second-mentioned motor in circuit with the second-mentioned generator, in the second position, to connect both of the motors in circuit relation with the first-mentioned generator only, and in the third position to connect both of the motors in circuit relation with the second-mentioned generator only, means for actuating the motor generator selective means to any one of said three operating positions, means for driving each generator, means for varying the speed of each generator-driving means, thereby varying the speed and load of the motors, a field winding for each generator and each motor, and means for varying the excitation of the field windings of the generators and the motors with variations in speed of the generator-driving means.

13. A control system comprising, in combination, an alternating-current generator, a synchronous motor, a second alternating-current generator, a second synchronous motor, a motor generator selective means, adapted, in the first position, to connect the first-mentioned motor in circuit relation with the first-mentioned generator and the second-mentioned motor in circuit with the second-mentioned generator, in the second position, to connect both of the motors in circuit relation with the first-mentioned generator only, and in the third position to connect both of the motors in circuit relation with the second-mentioned generator only, means for actuating the motor generator selective means to any one of said three operating positions, means for driving each generator, means for varying the speed of each generator-driving means, thereby varying the speed and load of the motors, a field winding for each generator and each motor, means for varying the excitation of the field windings of the generators and the motors with variations in speed of the generator-driving means, means adapted to prevent the interconnection of the generators and the motors and the energization of the field windings except when said speed-varying means are in certain low speed positions, and means included with the said last-named means for increasing the excitation of the generators and motors with reference to the speed of the generator-driving means as the speed decreases.

14. In a system of electric ship propulsion including a propeller-driving electric motor, an electric generator having a field, and an elastic fluid turbine, the method of reversing which comprises the successive steps of simultaneously decreasing the generator field excitation and the admission of elastic fluid to the turbine, deenergizing the generator field and substantially simultaneously therewith opening the connection between the generator and motor, reversing the connections between the motor and the generator and substantially simultaneously therewith energizing the generator field in excess of normal excitation, and simultaneously increasing the generator field excitation and the admission of elastic fluid to the turbine.

15. The method of starting and operating a synchronous motor which includes the steps of connecting the motor as an induction motor, supplying the motor with energy of a given frequency, transferring the motor from induction motor operation to synchronous motor operation when the motor has attained a given speed with reference to the frequency of the energy supplied to the motor, decreasing the frequency of the energy supplied to the motor a relatively small amount at substantially the same time the motor is transferred from induction motor operation to synchronous motor operation, whereby the motor and the generator fall into synchronism, and thereafter changing the frequency of the energy supplied to the motor to bring it to the desired speed of operation.

16. The method of starting a ship provided with turbo-electric propulsion, wherein the motor is a synchronous motor designed to start as an induction motor, which includes the steps of admitting a relatively small amount of steam to the turbine driving the alternator so that the frequency will be at a relatively low value, connecting the motor as an induction motor to the alternator, decreasing the admission of steam to the turbine by a relatively small amount to decrease the frequency of the current supplied to the motor, and transferring the motor from induction motor operation to synchronous motor operation at substantially the same instant the admission of steam is decreased.

17. The method of starting a ship provided with turbo-electric propulsion, wherein the motor is a synchronous motor designed to start as an induction motor, which includes the steps of admitting a relatively small amount of steam to the turbine driving the alternator so that the frequency will be at a relatively low value, connecting the motor as an induction motor to the alternator, varying the circuit arrangement of the motor to operate it as an induction motor at near synchronous speed for the turbine speed, and thus generator frequency, selected, decreasing the admission of steam to the turbine by a relatively small amount to decrease the frequency of the current supplied to the motor, and transferring the motor from induction motor operation to synchronous motor operation at substantially the same instant the admission of steam is decreased.

18. The method of starting a ship provided with electric propulsion, wherein the motor is a synchronous motor designed to start as an induction motor, which includes the steps of supplying the motor with current of a certain frequency for a time interval of sufficient length to operate the motor at a certain relatively small percent slip, decreasing the frequency of the current supplied to the motor by substantially the amount of the slip, and transferring the motor from induction motor operation to synchronous motor operation at substantially the time when the frequency of the current supplied to the motor is decreased.

19. In a ship propulsion system, in combination, a turbine, an alternator driven by the turbine, a propeller, a synchronous motor, adapted to be connected to the alternator, for driving the propeller, said motor being designed to start as an induction motor, means adapted to automatically connect said motor to said generator for induction motor operation and to admit a certain amount of steam to the turbine, whereby the frequency of the current supplied to said motor by said generator will have a predetermined value, and means adapted to automatically decrease the admission of steam to the turbine and to transfer the motor from induction motor operation to synchronous motor operation.

20. In a ship propulsion system, in combination, a turbine, an alternator driven by the turbine, a propeller, a synchronous motor, adapted to be connected to the alternator, for driving the propeller, said motor being designed to start as an induction motor, mechanical means adapted to automatically and substantially simultaneously connect said motor to said generator for induction motor operation and to admit a certain amount of steam to the turbine, whereby the frequency of the current supplied to said motor by said generator will have a predetermined value, and mechanical means adapted to automatically and substantially simultaneously decrease the admission of steam to the turbine and to transfer the motor from induction motor operation to synchronous motor operation.

21. A control system comprising, in combination, an alternating-current generator, a synchronous motor for driving a load, means for connecting the motor to the generator, means for driving the generator, means for varying the speed of the generator driving means, thereby varying the speed and the load of the motor connected to the generator, a field winding for the generator and a field winding for the motor, means, mechanically coupled to the means for interconnecting the generator and the motor adapted to establish a plurality of successive operating circuits for the field windings of both the generator and the motor, and means, coupled to the means for varying the speed of the generator driving means, adapted to less rapidly increase the excitation of the field windings with increases in speed.

22. A control system comprising, in combination, an alternating-current generator, a field winding therefor, a rheostat having an arm and adapted to decrease the effective resistance of the field winding less and less rapidly for equal movements of the arm as the resistance is decreased, a synchronous motor, a field winding therefor, a motor field rheostat having an arm and adapted to decrease the effective resistance of the field winding less and less rapidly for equal movements of the arm as the resistance is decreased, means for energizing the field windings, switching means for interconnecting the generator and motor, means for driving the generator, speed-varying means for the generator-driving means adapted to effect substantially proportional changes in speed for equal movements of the speed-varying means, and coupling means interconnecting the rheostat arms with the speed-varying means to move the arms equal amounts for equal movements of the speed-varying means.

23. A control system comprising, in combination, an alternating-current generator, a field winding therefor, a rheostat having an arm and adapted to decrease the effective resistance of the field winding less and less rapidly for equal movements of the arm as the resistance is decreased, a synchronous motor, a field winding therefor, a motor field rheostat having an arm and adapted to decrease the effective resistance of the field winding less and less rapidly for equal movements of the arm as the resistance is decreased, means for energizing the field windings, switching means for interconnecting the generator and motor, means for driving the generator, speed-varying means for the generator-driving means adapted to effect substantially proportional changes in speed for equal movements of the speed-varying means, coupling means interconnecting the rheostat arms with the speed-varying means to move the arms equal amounts for equal movements of the speed-varying means, means for restricting the operation of the speed-varying means to certain limits at the time said field windings are energized, and means for restricting the operation of the speed-varying means to certain limits at the time the generator and motor are interconnected by said switching means.

24. A control system comprising, in combination, an alternating-current generator, a field winding therefor, a synchronous motor, a field winding therefor, main switching means adapted to connect and disconnect the motor with the generator, a source of direct current, field switching means adapted to connect and disconnect the field windings with the source of direct current, means for varying the excitation of both field windings, driving means for driving the generator, speed-varying means for said driving means, means adapted to restrict the operation of said speed-varying means to certain limits when both said switching means are in open circuit position and means adapted to vary the excitation of said field windings with the variations in speed of said means for driving the generator.

25. A control system comprising, in combination, an alternating-current generator, a field winding therefor, a generator field rheostat having an arm, a synchronous motor, a field winding therefor, a motor field rheostat having an arm, switching means for connecting the motor to the generator means for exciting the field windings, driving means for the generator, and means adapted to simultaneously decrease the excitation of the field windings by appropriate operation of said rheostat arms, and decrease the speed of said driving means.

26. A control system comprising, in combination, an alternating-current generator, a field winding therefor, a source of direct current, a synchronous motor, a field winding therefor, main switching means adapted to connect and disconnect the motor with the generator, field switching means adapted to connect and disconnect the source of direct current with the field windings of both the generator and the motor, and interlocking means, between the main switching means and the field switching means, adapted to effect simultaneous operation of said main switching means and said field switching means.

27. A control system comprising, in combination, an alternating-current generator, a field winding therefor, driving means for the generator, speed-varying means for the driving means, a source of direct current, a synchronous motor, a field winding therefor, main switching means adapted to connect and disconnect the motor with the generator, field switching means adapted to connect and disconnect the source of direct current with the field windings of both the generator and the motor, interlocking means, between the main switching means and the field switching means, adapted to effect simultaneous operation of said main switching means and the field switching means, interlocking means between the speed varying means and both of said switching means to prevent the operation of both said switching means except when said speed-varying means is in certain positions of low speed for the driving means, and means for simultaneously varying the excitation of both field windings with variations in speed of the driving means.

28. A control system comprising, in combination, a plurality of alternating-current generators, a plurality of synchronous motors for driving a load, means for selectively connecting any one of the motors in circuit relation with any one of the generators, means for driving each generator, means for varying the speed of each generator-driving means, thereby varying the speed and the load of the selected motor that may be connected in circuit relation with the selected generator by the selective connecting means, a field winding for each generator and each motor, means for energizing only the field winding of the selected generator and the selected motor, and means adapted to simultaneously vary the excitation of the field windings of the respectively selected generator and motor with variations in the speed of the driving means for the generator.

29. A control system comprising, in combination, a plurality of alternating-current generators, a plurality of synchronous motors for driving a load, means for selectively connecting any number of motors in circuit relation with any one of the generators, means for driving each generator, means for varying the speed of each generator-driving means, thereby varying the speed and the load of the selected motors that may be connected in circuit relation with the selected generator by the selective connecting means, a field winding for each generator and each motor, means for energizing the field windings of only the selected generator and the selected motors, and means for simultaneously varying the excitation of the selected generator and of the selected motors with variations in speed of the generator-driving means.

30. A control system comprising, in combination, a plurality of alternating-current generators, a plurality of synchronous motors for driving a load, means for selectively connecting any number of motors in circuit relation with any one of the generators, means for driving each generator, means for varying the speed of each generator-driving means, thereby varying the speed and the load of the selected motors that may be connected in circuit relation with the selected generator by the selective connecting means, a field winding for each generator and each motor, means for energizing the field winding of only the selected generator and the selected motors, means for simultaneously varying the excitation of the selected generator and the selected motors with variations in speed of the generator-driving means, means adapted to prevent the interconnection of the generator with the motors and the energization of the field windings of the generator and the selected motors except when the speed-varying means is in certain positions, and means included with said last-named means for increasing the field excitations of the generator and the selected motors with reference to the speed of the generator-driving means as the speed decreases.

31. A control system comprising, in combination, an alternating-current generator, a synchronous motor, a second alternating-current generator, a second synchronous motor, a motor generator selective means, adapted, in the first position, to connect the first-mentioned motor in circuit relation with the first-mentioned generator and the second-mentioned motor in circuit with the second-mentioned generator, in the second position, to connect both of the motors in circuit relation with the first-mentioned generator only, and in the third position to connect both of the motors in circuit relation with the second-mentioned generator only, means for actuating the motor generator selective means to any one of said three operating positions, means for driving each generator, means for varying the speed of each generator-driving means, thereby varying the speed and load of the motors, a field winding for each generator and each motor, means for varying the excitation of the field windings of the generators and the motors with variations in speed of the generator-driving means, and means adapted to prevent the interconnection of the generators and the motors and the energization of the field windings except when said speed-varying means are in certain low speed positions.

32. In a system of electric ship propulsion including a propeller-driving electric motor, an electric generator having a field, and an elastic fluid turbine, the method of reversing which comprises the successive steps of simultaneously decreasing the generator field excitation and the admission of elastic fluid to the turbine, deenergizing the generator field and substantially simultaneously therewith opening the connection between the generator and motor, reversing the connections between the motor and the generator and substantially simultaneously therewith energizing the generator field in excess of normal excitation, and increasing the quantity of steam admitted to the turbine and simultaneously therewith, but less rapidly, increasing the excitation of the generator field.

33. The method of starting a synchronous motor which includes supplying the motor with current of a certain frequency for a time interval of sufficient length to operate the motor at a certain relatively small percent slip, decreasing the frequency of the current supplied to the motor by substantially the amount of the slip, and transferring the motor from induction motor operation to synchronous motor operation at substantially the time when the frequency of the current supplied to the motor is decreased.

34. The method of starting a ship provided with turbo-electric propulsion, wherein the motor is a synchronous motor designed to start as an induction motor, which includes the steps of admitting a relatively small amount of steam to the turbine driving the alternator so that the frequency will be at a relatively low value, connecting the motor as an induction motor to the alternator, varying the circuit arrangement of the motor to operate it as an induction motor at near synchronous speed for the turbine speed, and thus the generator frequency selected, decreasing the admission of steam to the turbine by a relatively small amount to decrease the frequency of the current supplied to the motor, transferring the motor operation to synchronous motor operation at substantially the same instant the admission of steam is decreased, and thereafter increasing the amount of steam admitted to the turbine to bring the motor, operating as a synchronous motor, up to the full speed desired.

35. The method of starting a ship provided with turbo-electric propulsion, wherein the motor is a synchronous motor designed to start as an induction motor, which includes the steps of admitting a relatively small amount of steam to the turbine driving the alternator so that the frequency will be at a relatively low value, connecting the motor as an induction motor to the alternator, decreasing the admission of steam to the turbine by a relatively small amount to decrease the frequency of the current supplied to the motor, transferring the motor from induction motor operation to synchronous motor operation at substantially the same instant the admission of steam is decreased, and thereafter increasing the amount of steam admitted to the turbine to bring the motor, operating as a synchronous motor, up to the full speed desired.

36. The method of starting and operating a ship provided with electric propulsion, wherein the motor is a synchronous motor designed to start as an induction motor, which includes the steps of supplying the motor with current of a certain frequency for a time interval of sufficient length to operate the motor at a certain relatively small percent slip, decreasing the frequency of the current supplied to the motor by substantially the amount of the slip, transferring the motor from induction motor operation to synchronous motor operation at substantially the time when the frequency of the current supplied to the motor is decreased, and thereafter changing the frequency of the current supplied to the motor, operating as a synchronous motor, to vary the speed of the ship as desired.

37. In a ship propulsion system, in combination, a turbine, an alternator driven by the turbine, a propeller, a synchronous motor, adapted to be connected to the alternator, for driving the propeller, said motor being designed to start as an induction motor, means adapted to automatically connect said motor to said generator for induction motor operation and to admit a certain amount of steam to the turbine, whereby the frequency of the current supplied to said motor by said generator will have a predetermined value, means adapted to automatically decrease the admission of steam to the turbine and to transfer the motor from induction motor operation to synchronous motor operation, and means, operable after said last-named means, adapted to vary the admission of steam at will.

38. In a ship propulsion system, in combination, a turbine, an alternator driven by the turbine, a propeller, a synchronous motor, adapted to be connected to the alternator, for driving the propeller, said motor being designed to start as an induction motor, electrical means adapted to automatically and substantially simultaneously connect said motor to said generator for induction motor operation and to admit a certain amount of steam to the turbine, whereby the frequency of the current supplied to said motor by said generator will have a predetermined value, and electrical means adapted to automatically and substantially simultaneously decrease the admission of steam to the turbine and to transfer the motor from induction motor operation to synchronous motor operation.

39. In a ship propulsion system, in combination, a turbine, an alternator driven by the turbine, a propeller, a synchronous motor, adapted to be connected to the alternator, for driving the propeller, said motor being designed to start as an induction motor, electrical means adapted to automatically and substantially simultaneously connect said motor to said generator for induction motor operation and to admit a certain amount of steam to the turbine whereby the frequency of the current supplied to said motor by said generator will have a predetermined value, electrical means adapted to automatically and substantially simultaneously decrease the admission of steam to the turbine and to transfer the motor from induction motor operation to synchronous motor operation, and means operable after said last-named means, adapted to vary the admission of steam to the turbine at will.

40. In a ship propulsion system, in combination, a turbine, an alternator driven by the turbine, a propeller, a synchronous motor, adapted to be connected to the alternator, for driving the propeller, said motor being designed to start as an induction motor, mechanical means adapted to automatically and substantially simultaneously connect said motor to said generator for induction motor operation and to admit a certain amount of steam to the turbine, whereby the frequency of the current supplied to said motor by said generator will have a predetermined value, mechanical means adapted to automatically and substantially simultaneously decrease the admission of steam to the turbine and to transfer the motor from induction motor operation to synchronous motor operation, and means, operable after said last-named means, adapted to vary the admission of steam to the turbine at will.

WALTER SCHAELCHLIN.